United States Patent
Takahashi et al.

(10) Patent No.: US 8,436,921 B2
(45) Date of Patent: May 7, 2013

(54) PICTURE SIGNAL PROCESSING SYSTEM, PLAYBACK APPARATUS AND DISPLAY APPARATUS, AND PICTURE SIGNAL PROCESSING METHOD

(75) Inventors: Naomasa Takahashi, Chiba (JP); Jun Hirai, Tokyo (JP); Tomotaka Kuraoka, Tokyo (JP)

(73) Assignee: Sony Corporation, Tokyo (JP)

( * ) Notice: Subject to any disclaimer, the term of this patent is extended or adjusted under 35 U.S.C. 154(b) by 851 days.

(21) Appl. No.: 12/562,710

(22) Filed: Sep. 18, 2009

(65) Prior Publication Data
US 2010/0086282 A1  Apr. 8, 2010

(30) Foreign Application Priority Data
Oct. 8, 2008 (JP) .................. 2008-261245

(51) Int. Cl.
*H04N 5/66* (2006.01)
*H04N 9/80* (2006.01)

(52) U.S. Cl.
USPC .......................................... 348/241; 348/739

(58) Field of Classification Search .............. 348/739; 386/241
See application file for complete search history.

(56) References Cited

U.S. PATENT DOCUMENTS

| | | | |
|---|---|---|---|
| 5,930,445 A * | 7/1999 | Peters et al. ................ | 386/290 |
| 6,335,742 B1 * | 1/2002 | Takemoto ................... | 715/781 |
| 6,728,317 B1 * | 4/2004 | Demos ..................... | 375/240.21 |
| 7,050,102 B1 * | 5/2006 | Vincent ..................... | 348/333.02 |
| 7,508,815 B2 * | 3/2009 | Lapeyre et al. .............. | 370/352 |
| 8,111,324 B2 * | 2/2012 | Kempf ......................... | 348/448 |
| 8,166,501 B2 * | 4/2012 | Shikuma et al. .............. | 725/38 |
| 2005/0248476 A1 * | 11/2005 | Wiser et al. ................... | 341/50 |
| 2006/0031895 A1 * | 2/2006 | Kwon et al. .................. | 725/100 |
| 2006/0221001 A1 | 10/2006 | Matono et al. | |
| 2007/0030341 A1 | 2/2007 | Morimoto | |
| 2007/0058937 A1 | 3/2007 | Ando et al. | |
| 2007/0200918 A1 * | 8/2007 | Kwon et al. ................ | 348/14.03 |
| 2007/0225840 A1 * | 9/2007 | Yahata et al. .................. | 700/94 |
| 2007/0233906 A1 * | 10/2007 | Tatum et al. .................. | 710/26 |
| 2007/0269192 A1 * | 11/2007 | Sato ............................ | 386/126 |

(Continued)

FOREIGN PATENT DOCUMENTS
EP  1 439 707 A2  7/2004
EP  1 503 582 A1  2/2005
(Continued)

OTHER PUBLICATIONS

European Office Action issued Jul. 5, 2011, in Patent Application No. 09 172 536.6.

*Primary Examiner* — Alina N. Boutah
(74) *Attorney, Agent, or Firm* — Sony Corporation

(57) ABSTRACT

A picture signal processing system includes a playback apparatus and a display apparatus connected via first and second communication units. The playback apparatus receives a video signal made up of source data generated by moving giant image data in a constant direction at a constant speed, wherein the giant image data has a number of pixels far greater than the number of pixels in a display region. The playback apparatus reads source data speed information stored in the video signal header, and transmits the video signal and the speed information to the display apparatus. The display apparatus references a table to determine how to process the video signal on the basis of the speed information, processes the video signal, and then displays the processed video signal.

13 Claims, 24 Drawing Sheets

U.S. PATENT DOCUMENTS

| | | | |
|---|---|---|---|
| 2008/0030614 A1* | 2/2008 | Schwab et al. | 348/441 |
| 2008/0107276 A1* | 5/2008 | Ichimura | 381/1 |
| 2008/0129879 A1* | 6/2008 | Shao et al. | 348/723 |
| 2008/0211830 A1* | 9/2008 | Abe et al. | 345/604 |
| 2008/0278567 A1* | 11/2008 | Nakajima | 348/14.02 |
| 2009/0033791 A1* | 2/2009 | Rodriguez et al. | 348/384.1 |
| 2009/0077606 A1* | 3/2009 | Machida et al. | 725/118 |
| 2009/0086099 A1* | 4/2009 | Higaki | 348/554 |
| 2009/0184916 A1* | 7/2009 | Miyazaki et al. | 345/102 |
| 2009/0193101 A1* | 7/2009 | Munetsugu et al. | 709/219 |
| 2009/0208123 A1* | 8/2009 | Doswald | 382/236 |
| 2009/0278984 A1* | 11/2009 | Suzuki et al. | 348/554 |
| 2009/0300145 A1* | 12/2009 | Musayev et al. | 709/219 |
| 2009/0317059 A1* | 12/2009 | Chen et al. | 386/95 |
| 2009/0322940 A1* | 12/2009 | Kempf | 348/448 |
| 2010/0033627 A1* | 2/2010 | Hayashi et al. | 348/500 |
| 2010/0157154 A1* | 6/2010 | Kobayashi et al. | 348/557 |
| 2010/0265396 A1* | 10/2010 | Frederick et al. | 348/462 |
| 2010/0269137 A1* | 10/2010 | Nakajima et al. | 725/39 |
| 2010/0292820 A1* | 11/2010 | Yahata et al. | 700/94 |
| 2011/0001873 A1* | 1/2011 | Doswald et al. | 348/448 |

FOREIGN PATENT DOCUMENTS

| | | |
|---|---|---|
| JP | 2005-026885 A | 1/2005 |
| JP | 2006-166147 A | 6/2006 |
| JP | 2007-43505 | 2/2007 |

* cited by examiner

FIG. 7

| SYNTAX | NO. OF BITS | MNEMONIC |
|---|---|---|
| zzzzz.clpi { | | |
|     type_indicator | 8*4 | bslbf |
|     version_number | 8*4 | bslbf |
|     SequenceInfo_start_address | 32 | uimsbf |
|     ProgramInfo_start_address | 32 | uimsbf |
|     CPI_start_address | 32 | uimsbf |
|     ClipMark_start_address | 32 | uimsbf |
|     ExtensionData_start_address | 32 | uimsbf |
|     reserved_for_future_use | 96 | bslbf |
|     ClipInfo() | | |
|     for (i=0; i<N1; i++) { | | |
|         padding_word | 16 | bslbf |
|     } | | |
|     SequenceInfo() | | |
|     for (i=0; i<N2; i++) { | | |
|         padding_word | 16 | bslbf |
|     } | | |
|     ProgramInfo() | | |
|     for (i=0; i<N3; i++) { | | |
|         padding_word | 16 | bslbf |
|     } | | |
|     CPI() | | |
|     for (i=0; i<N4; i++) { | | |
|         padding_word | 16 | bslbf |
|     } | | |
|     ClipMark() | | |
|     for (i=0; i<N5; i++) { | | |
|         padding_word | 16 | bslbf |
|     } | | |
|     ExtensionData() | | |
|     for (i=0; i<N6; i++) { | | |
|         padding_word | 16 | bslbf |
|     } | | |
| } | | |

FIG. 8

| SYNTAX | NO. OF BITS | MNEMONIC |
|---|---|---|
| ProgramInfo(){ | | |
|   length | 32 | uimsbf |
|   reserved_for_word_align | 8 | bslbf |
|   number_of_program_sequences | 8 | uimsbf |
|   for (i=0; i<*number_of_program_sequences*; i++){ | | |
|     SPN_program_sequences_start[*i*] | 32 | uimsbf |
|     program_map_PID[*i*] | 16 | uimsbf |
|     number_of_streams_in_ps[*i*] | 8 | uimsbf |
|     reserved_for_future_use | 8 | bslbf |
|     for (*stream_index*=0;<br>        *stream_index*<*number_of_streams_in_ps[i]*;<br>        *stream_index*++){ | | |
|       stream_PID[*i*][*stream_index*] | 16 | uimsbf |
|       StreamCodingInfo(*i, stream_index*) | | |
|     } | | |
|   } | | |
| } | | |

FIG. 9

| SYNTAX | NO. OF BITS | MNEMONIC |
|---|---|---|
| StreamCodingInfo(i, stream_index){ | | |
|     length | 8 | uimsbf |
|     stream_coding_type | 8 | bslbf |
|     if (stream_coding_type==0x02 \|\|<br>        stream_coding_type==0x1B \|\|<br>        stream_coding_type==0xEA){ | | |
|         video_format | 4 | bslbf |
|         frame_rate | 4 | bslbf |
|         aspect_ratio | 4 | bslbf |
|         reserved_for_future_use | 2 | bslbf |
|         cc_flag | 1 | bslbf |
|         reserved_for_future_use | 17 | bslbf |
|         ISRC() | | |
|         reserved_for_future_use | 32 | bslbf |
|     } else if (stream_coding_type==0x80 \|\|<br>        stream_coding_type==0x81 \|\|<br>        stream_coding_type==0x82 \|\|<br>        stream_coding_type==0x83 \|\|<br>        stream_coding_type==0x84 \|\|<br>        stream_coding_type==0x85 \|\|<br>        stream_coding_type==0x86 \|\|<br>        stream_coding_type==0xA1 \|\|<br>        stream_coding_type==0xA2){ | | |
|         audio_presentation_type | 4 | bslbf |
|         sampling_frequency | 4 | bslbf |
|         audio_language_code | 8*3 | bslbf |
|         ISRC() | | |
|         reserved_for_future_use | 32 | bslbf |
|     } else if (stream_coding_type==0x90){<br>        // Presentation_Graphics_stream | | |
|         PG_language_code | 8*3 | bslbf |
|         reserved_for_future_use | 8 | bslbf |
|         ISRC() | | |
|         reserved_for_future_use | 32 | bslbf |
|     } else if (stream_coding_type==0x91){<br>        // Interactive_Graphics_stream | | |
|         IG_language_code | 8*3 | bslbf |
|         reserved_for_future_use | 8 | bslbf |
|         ISRC() | | |
|         reserved_for_future_use | 32 | bslbf |
|     } else if (stream_coding_type==0x92){<br>        // Text_subtitle_stream | | |
|         character_code | 8 | bslbf |
|         textST_language_code | 8*3 | bslbf |
|         ISRC() | | |
|         reserved_for_future_use | 32 | bslbf |
|     } | | |
| } | | |

FIG. 10

| VIDEO FORMAT | MEANING | VIDEO STANDARD |
| --- | --- | --- |
| 0 | RESERVED | |
| 1 | 480i | ITU-R BT.601-5[38] |
| 2 | 576i | ITU-R BT.601-4[38] |
| 3 | 480p | SMPTE 293M[39] |
| 4 | 1080i | SMPTE 274M[40] |
| 5 | 720p | SMPTE 296M[41] |
| 6 | 1080p | SMPTE 274M[40] |
| 7 | 576p | ITU-R BT.1358[42] |
| 8-14 | RESERVED | |
| 15 | RESERVED | |

FIG. 11

| FRAME RATE | MEANING [Hz] |
| --- | --- |
| 0 | RESERVED |
| 1 | 24 000/1001 (23.976...) |
| 2 | 24 |
| 3 | 25 |
| 4 | 30 000/1001 (29.97...) |
| 5 | RESERVED |
| 6 | 50 |
| 7 | 60 000/1001 (59.94...) |
| 8 | RESERVED |
| 9-14 | RESERVED |
| 15 | RESERVED |

| VALUE | FUNCTION |
|---|---|
| 0 | KEEP CURRENT FRAME RATE |
| 1 | VARIABLE SPEED |

| VALUE | FUNCTION |
|---|---|
| 1-255 | 1/VALUE [sec/pixel] |

| BYTE/BIT # | 7 | 6 | 5 | 4 | 3 | 2 | 1 |
|---|---|---|---|---|---|---|---|
| HB0 | PACKET TYPE ||||||||
| HB1 | PACKET-SPECIFIC DATA ||||||||
| HB2 | PACKET-SPECIFIC DATA ||||||||

FIG. 14

| PACKET TYPE VALUE | | PACKET TYPE |
|---|---|---|
| 0x00 | | NULL |
| 0x01 | | AUDIO CLOCK REGENERATION (N/CTS) |
| 0x02 | | AUDIO SAMPLE (L-PCM AND 61937 COMPRESSED FORMATS) |
| 0x03 | | GENERAL CONTROL |
| 0x04 | | ACP PACKET |
| 0x05 | | ISRC1 PACKET |
| 0x06 | | ISRC2 PACKET |
| 0x07 | | ONE BIT AUDIO SAMPLE PACKET |
| 0x08 | | DST AUDIO PACKET |
| 0x09 | | HIGH BITRATE (HBR) AUDIO STREAM PACKET (IEC 61937) |
| 0x0A | | GAMUT MEADATA PACKET |
| 0x80+InfoFrame TYPE | | InfoFrame PACKET |
| | 0x81 | VENDOR-SPECIFIC InfoFrame |
| | 0x82 | AVI InfoFrame |
| | 0x83 | SOURCE PRODUCT DESCRIPTOR InfoFrame |
| | 0x84 | AUDIO InfoFrame |
| | 0x85 | MPEG SOURCE InfoFrame |

FIG. 15

| SPEED (FRAME RATE) [Hz] | PROCESSING |
|---|---|
| 24 | HIGH FRAME RATE |
| 30 | 2-2 PULLDOWN |
| 60 | 2-2 PULLDOWN |
| 72 | HIGH FRAME RATE |
| 96 | HIGH FRAME RATE |
| 120 | 2-2 PULLDOWN/HIGH FRAME RATE |

FIG. 18

| PACKET START CODE | | PACKET LENGTH (16) | "10" (2) | FLAGS AND CONTROLS (14) | PES HEADER LENGTH (8) | CONDITIONAL CODING | | | | PES PACKET DATA (VARIABLE LENGTH) |
|---|---|---|---|---|---|---|---|---|---|---|
| PREFIX (24) | STREAM ID (8) | | | | | PTS (33+7) | DTS (33+7) | OTHER (VARIABLE LENGTH) | STUFFING BYTES (VARIABLE BYTE LENGTH) | |

FIG. 19

| | |
|---|---|
| ESCR | 42 + 6 |
| ES RATE | 22 + 2 |
| TRICK MODE CONTROL DATA | 8 |
| ADDITIONAL COPY INFORMATION | 7 + 1 |
| PRECEDING COPY INFORMATION | 16 |
| PES EXPANSION CONTROL | 5 + 3 |
| PES PRIVATE DATA | 128 |
| PACK HEADER INFORMATION LENGTH | 8 |
| PACKET SEQUENCE COUNTER | 7 + 1 |
| MPEG-1/MPEG-2 IDENTIFIER | 1 + 1 |
| ORIGINAL STUFFING LENGTH | 6 |
| PACK HEADER LENGTH | UNDEFINED |
| BUFFER SCALE | 1 |
| BUFFER SIZE | 13 |
| PES EXTENSION LENGTH | 7 + 1 |
| EXTENSION DATA | UNDEFINED/RESERVED |

FIG. 20A

| BIT | 0 | 1 | 2 | 3 | 4 | 5 | 6 | 7 | 8 |

FIG. 20B

| VALUE | FUNCTION |
|---|---|
| 0 | KEEP CURRENT FRAME RATE |
| 1 | VARIABLE SPEED |

FIG. 20C

| VALUE | FUNCTION |
|---|---|
| 1-255 | 1/VALUE [sec/pixel] |

PICTURE SIGNAL PROCESSING SYSTEM, PLAYBACK APPARATUS AND DISPLAY APPARATUS, AND PICTURE SIGNAL PROCESSING METHOD

BACKGROUND OF THE INVENTION

1. Field of the Invention

The present invention relates to a picture signal processing system, a playback apparatus and display apparatus, as well as a picture signal processing method used to display a video signal made up of source data wherein image data, having a total number of pixels greater than the number of visible pixels on a display screen, is moved in a constant direction at a constant speed.

2. Description of the Related Art

For many years, panoramic photographs acquired using film cameras have enjoyed broad popularity. Panoramic photographs can be acquired using special equipment wherein a lens provided in a film camera is mechanically rotated, or by using a film camera provided with a wide-angle lens such that the imaged portion is wide with respect to the film.

Together with decline of film cameras and the broad adoption of digital cameras, taking panoramic photographs using digital cameras has become easier. More specifically, as shown by way of example in FIG. 27, a digital camera may be continuously moved in a rotating manner while successively taking pictures that overlap to some degree along a constant direction (such as vertical or horizontal). Subsequently, stitching or similar software loaded onto a personal computer (PC) is used to join the acquired images in a particular way. As a result, a panoramic image with a field of view much wider than that of the digital camera can be created. For example, Japanese Unexamined Patent Application Publication No. 2007-43505 discloses a method for controlling a camera when taking panoramic images, as well as a method for creating a panoramic image from image data acquired by such control.

Ordinarily, panoramic images created in such a way are often enjoyed as panoramic photographs printed out using a printer or other means. However, enjoying printed panoramic photographs created from digital data is similar to that of panoramic photographs acquired with a film camera in that the experience is static, and lacks the opportunities for enjoyment that digital data enables.

On the other hand, it is conceivable to enjoy created panoramic images by displaying them on the display of a PC. The performance of image sensors such as CCDs (Charge-Coupled Devices) and CMOS (Complementary Metal Oxide Semiconductor) imagers is steadily improving in recent digital cameras, and high-resolution image data can be acquired. For this reason, panoramic images created by joining together such high-resolution image data have high resolutions far exceeding the resolution of the display.

Consequently, when displaying a panoramic image on the display of a PC, the number of pixels in the image data is decreased to match the number of display pixels in the display, for example. However, decreasing the number of pixels in the image data involves operations such as resampling the pixels in the image data, which leads to poorer resolution.

Particularly, panoramic images like those described above typically have high resolutions far exceeding the resolution of the display. For this reason, when displaying panoramic images or similar image data with a very large number of pixels on a display, the image resize ratio becomes extremely large, and the resolution of the image data is lost.

In this way, it is typically difficult to fully enjoy panoramic images on a PC, due to the problem of the screen size and resolution of the display.

It is also conceivable to read and render the image data in integer units of pixels in either the horizontal or vertical direction, using software installed on a PC, for example. In so doing, a panoramic image can be dynamically displayed by being moved at a constant speed, as shown in FIG. 28. More specifically, panoramic image can be enjoyed this way over the Web, using software written in JavaScript™.

However, in this case, the image data might not move smoothly overall, or parts of the image data might be intermittently lost, depending on factors such as the performance of the PC and the operation system (OS). For this reason, it is difficult to stably and cleanly display a panoramic image.

Meanwhile, increased television picture resolution has been realized in recent years, following advances in digital transmission and picture data coding technologies. For example, an interlaced resolution of 1920×1080 pixels (1080i) has been realized for high-definition (HD) video available over current terrestrial digital television broadcasts. Furthermore, a progressive resolution of 1920×1080 pixels (1080p) has also been defined as a standard. In conjunction with the above, television receivers for displaying video on a television have also advanced, and a large number of products having a number of visible display pixels corresponding to HD resolutions are being developed, using technologies such as liquid crystal display (LCD), plasma display panel (PDP), and organic electroluminescence (EL). Furthermore, the High Definition Multimedia Interface (HDMI) has been finalized as an interface standard for transmitting HD television signals. Such television receivers (hereinafter referred to as TVs) have large screen sizes and high resolutions compared to PC displays.

Consider the case wherein a panoramic image is displayed dot-by-dot and dynamically moved across a TV or similar display apparatus that displays pictures at a resolution of 1920×1080 pixels. In this case, the resolution of the panoramic image is converted such that the number of pixels in either the horizontal or the vertical direction of the image matches that of the TV, and then the image is moved at constant speed.

For example, in the case of a wide panoramic image as shown in FIG. 28, the resolution of the image is converted such that the number of pixels in the vertical direction of the image data becomes equal to 1080, the number of pixels in the vertical direction of the display apparatus. Subsequently, the image is moved in the horizontal direction in predetermined pixel units, and synchronously with the refresh rate of the display apparatus. For example, in the case of the NTSC (National Television System Committee) format, the refresh rate of the display apparatus is 60 Hz, and thus the image is moved in the horizontal direction in integer units of pixels (such as 1 or 2 pixels) every 1/60 seconds and synchronously with the refresh rate. In so doing, it becomes possible to play back a panoramic image that moves in pixel units.

In the case of a tall panoramic image, the resolution of the image may be converted such that the number of pixels in the horizontal direction of the image data becomes equal to 1920, the number of pixels in the vertical direction of the display apparatus.

In this case, since the original resolution of the panoramic image is high, the user can view an extremely high-definition panoramic image displayed on a TV, without noticing the imperfections such as noise and Bayer patterns that are characteristic of digital cameras.

SUMMARY OF THE INVENTION

Meanwhile, recent years have seen broad adoption of playback apparatus that play back image data that has been recorded onto a recording medium such as a Blu-ray™ Disc (BD) or Digital Versatile Disc (DVD). Typically, such playback apparatus output image data in interlaced format. On the other hand, display apparatus such TVs that use LCD, PDP, or organic EL technology display image data in progressive format. For this reason, when interlaced image data output from a playback apparatus is to be displayed in progressive format, I/P (interlaced/progressive) conversion is conducted to deinterlace the image data (i.e., convert the image data to progressive format).

For example, one method for converting an interlaced source to progressive format involves simply superimposing the odd field images and the even field images to generate single frame images, as shown in FIG. 29.

However, when simple field blending is used to generate single frame images from two field images, the number of images decreases, thereby changing the frame rate. Moreover, in the case of fast-moving video, the above might result in blurred or ghosted pictures, like that shown in FIG. 30.

Thus, when blending fields with fast motion, a single field image is used and the missing lines are interpolated. In contrast, when there is little to no motion, motion compensation or similar techniques are performed using two field images while interpolating the fields decreased by one-half using field blending, and thereby maintaining the original frame rate.

When conducting line interpolation within a single field image at this point, the picture might become blurred overall compared to the case of blending two field images. Additionally, it is also conceivable to conduct field blending while switching between intra-field interpolation and inter-field interpolation according to the image content. However, image quality might suffer, depending on the switching method.

I/P conversion can be conducted using a variety of methods other than those described above. However, there is a problem with the methods used in the related art in that image quality suffers when converting an interlaced source to progressive format, and obtaining the expected picture quality is difficult.

Consequently, it is desirable to provide a picture signal processing system, a playback apparatus and display apparatus, as well as a picture signal processing method able to cleanly display image data moving in a constant direction and having a number of pixels greater than the number of visible pixels in the display screen.

A picture signal processing system in accordance with a first embodiment of the present invention includes a playback apparatus and a display apparatus. The playback apparatus includes: an input unit configured to receive a video signal made up of source data generated by moving giant image data in a constant direction at a constant speed, wherein the giant image data has a number of pixels far greater than the number of pixels in a display region; a playback unit configured to play back the video signal input into the input unit; and a first communication unit configured to communicate with other equipment. The playback apparatus is able to exchange video signals with other equipment via the first communication unit. The display apparatus includes: a picture signal processor configured to process a video signal in a predetermined way; a display configured to display the processed video signal; a table wherein speed information indicating speeds of the source data for the video signal is associated with types of processing to be applied to the video signal; and a second communication unit configured to communicate with other equipment. The display apparatus is able to exchange video signals with other equipment via the second communication unit. When the playback apparatus and the display apparatus are connected by the first and second communication units, the playback apparatus reads out source data speed information stored in the header of the video signal, and transmits the video signal and the speed information to the display apparatus. The display apparatus references the table and applies picture signal processing to the video signal on the basis of the speed information received via the second communication unit.

A picture signal processing method in accordance with a second embodiment of the present invention is executed by a playback apparatus and a display apparatus. The playback apparatus is able to: receive as input a video signal made up of source data generated by moving giant image data in a constant direction at a constant speed, wherein the giant image data has a number of pixels far greater than the number of pixels in a display region; play back the input video signal; and exchange video signals with other equipment via a first communication unit. The display apparatus is able to: process a video signal in a predetermined way; display the processed video signal on a display; and exchange video signals with other equipment via a second communication unit. When the playback apparatus and the display apparatus are connected by the first and second communication units, the method includes the steps of: in the playback apparatus, reading out speed information indicating the speed of the source data and stored in the header of the video signal; transmitting the video signal and the speed information to the display apparatus; and in the display apparatus, referencing a table wherein speed information for the source data of the video signal is associated with types of processing; and applying picture signal processing to the video signal on the basis of the received speed information.

A playback apparatus in accordance with a third embodiment of the present invention includes: an input unit configured to receive a video signal made up of source data generated by moving giant image data in a constant direction at a constant speed, wherein the giant image data has a number of pixels far greater than the number of pixels in a display region; a playback unit configured to play back the video signal input into the input unit; and a first communication unit configured to communicate with other equipment. By means of communication established via the first communication unit, the playback apparatus exchanges video signals with the other equipment, and in addition, reads out source data speed information stored in the header of the video signal, and transmits the video signal and the speed information to the other equipment.

A picture signal processing method in accordance with a fourth embodiment of the present invention is executed by a playback apparatus. The playback apparatus is able to: receive as input a video signal made up of source data generated by moving giant image data in a constant direction at a constant speed, wherein the giant image data has a number of pixels far greater than the number of pixels in a display region; play back the input video signal; and exchange video signals with other equipment via a first communication unit. When the playback apparatus is connected to the other equipment via the first communication unit, the method includes the steps of: in the playback apparatus, reading out source data speed information stored in the header of the video signal; and transmitting the video signal and the speed information to the other equipment.

A display apparatus in accordance with a fifth embodiment of the present invention includes: a picture signal processor configured to process a video signal in a predetermined way, wherein the video signal is made up of source data generated by moving giant image data in a constant direction at a constant speed, and wherein the giant image data has a number of pixels far greater than the number of pixels in a display region; a display configured to display the processed video signal; a table wherein speed information indicating speeds of the source data for the video signal is associated with types of processing to be applied to the video signal; and a second communication unit configured to communicate with other equipment. By means of communication established via the second communication unit, the display apparatus exchanges video signals with the other equipment, and in addition, receives the speed information, references the table, and applies picture signal processing to the video signal on the basis of the received speed information.

A picture signal processing method in accordance with a sixth embodiment of the present invention is executed by a display apparatus. The display apparatus is able to: process a video signal in a predetermined way, wherein the video signal is made up of source data generated by moving giant image data in a constant direction at a constant speed, and wherein the giant image data has a number of pixels far greater than the number of pixels in a display region; display the processed video signal; and exchange video signals with other equipment via a second communication unit. When the display apparatus is connected to the other equipment via the second communication unit, the method includes the steps of: in the display apparatus, receiving speed information indicating the speed of the source data for the video signal; referencing a table wherein speed information for the source data of the video signal is associated with types of processing to be applied to the video signal; and applying picture signal processing to the video signal on the basis of the received speed information.

According to an embodiment of the present invention, predetermined picture signal processing is conducted when displaying a video signal made up of source data generated by moving image data in a constant direction at constant speed, and wherein the image data is giant image data having a number of pixels far exceeding the number of pixels in the display region. At this point, picture signal processing such as 2-2 pulldown or high frame rate processing is conducted in accordance with the speed of the source data in the video signal. For this reason, the input video signal can be smoothly displayed.

BRIEF DESCRIPTION OF THE DRAWINGS

FIG. 7 illustrates the syntax expressing the structure of an exemplary clip information file;

FIG. 8 illustrates the syntax expressing the structure of an exemplary ProgramInfo( ) block;

FIG. 9 illustrates the syntax expressing the structure of an exemplary StreamCodingInfo(stream_index) block;

FIG. 10 shows a list of exemplary video data formats displayed in the video_format field;

FIG. 11 shows a list of exemplary frame rates displayed in the frame_rate field;

FIG. 14 is a schematic diagram for explaining packet types;

FIG. 15 is a schematic diagram for explaining a table of processes that depend on speed information;

FIG. 18 is a schematic diagram for explaining a PES packet header;

FIG. 19 is a schematic diagram for explaining a PES packet header:

FIG. 20A is a schematic diagram for explaining how speed information is stated;

FIG. 20B is a schematic diagram for explaining how speed information is stated;

FIG. 20C is a schematic diagram for explaining how speed information is stated;

DESCRIPTION OF THE PREFERRED EMBODIMENTS

Hereinafter, a first embodiment of the present invention will be described. In the first embodiment of the present invention, a panoramic image or similar image data having a number of pixels exceeding that of the display region in the display apparatus (hereinafter referred to as giant image data) is moved in a constant direction and at constant speed in order to generate a video signal, which is then played back by a playback apparatus and displayed in the display region of a display apparatus.

At this point, the playback apparatus outputs an interlaced video signal at a standard field rate of 60 Hz (hereinafter referred to as 60i). The display apparatus does not subject the input 60i video signal to ordinary I/P (interlaced/progressive) conversion, but instead performs 2-2 pulldown to convert and display a progressive video signal at frame rate of 60 Hz (hereinafter referred to as 60p).

Figure 1:
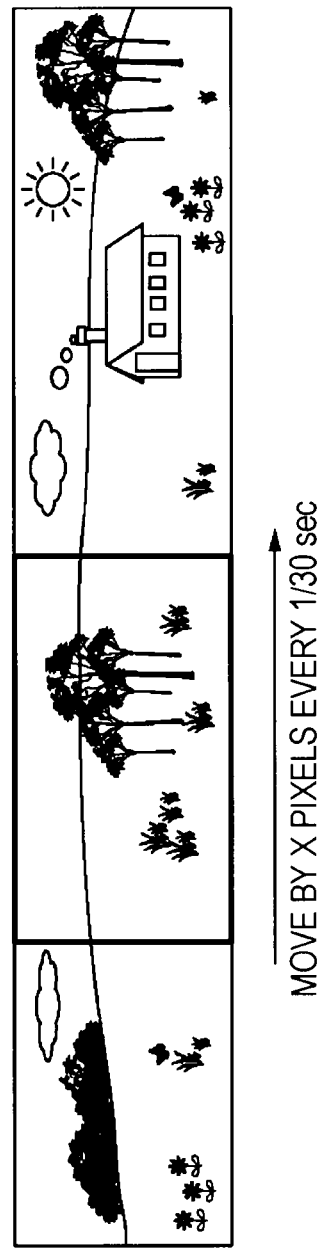
FIG. 1 is a schematic diagram for explaining the case of moving giant image data as it is displayed.
Figure 2:
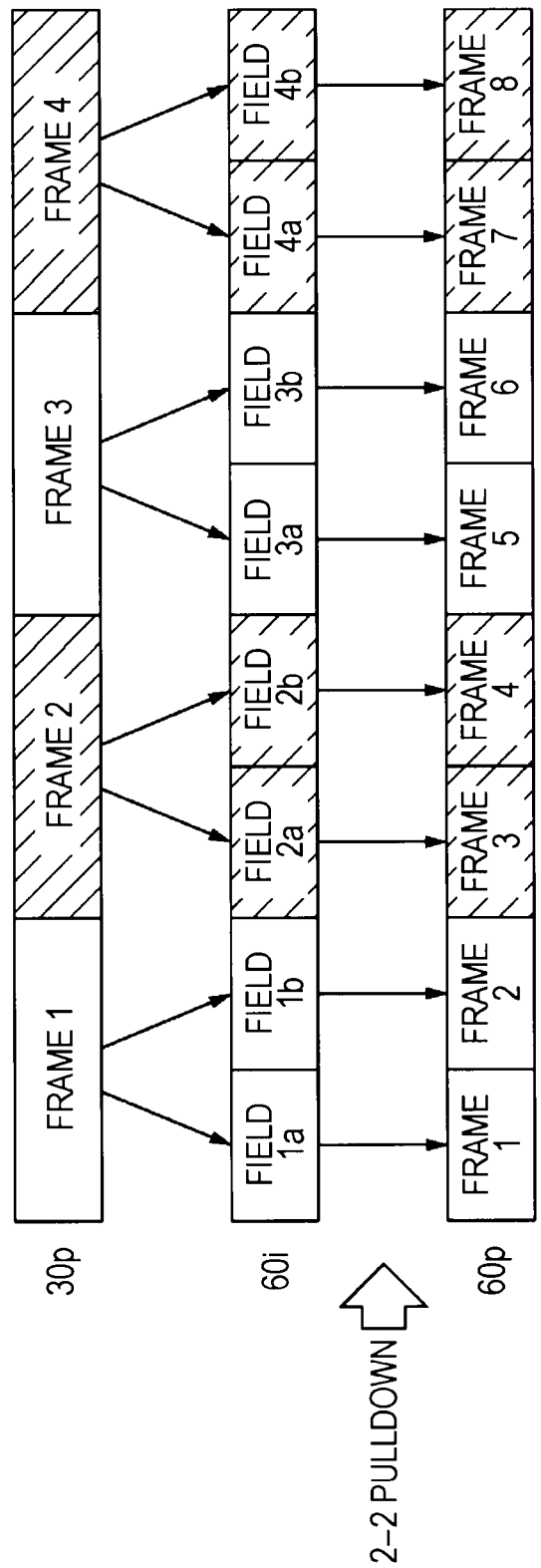
FIG. 2 is a schematic diagram for explaining 2-2 pulldown.

A more detailed description will now be given with reference to FIGS. 1 and 2. Herein, an example is described for the case wherein a playback apparatus reads a video signal that is based on giant image data for a panoramic or similar image recorded onto a recording medium such as a Blu-ray™ Disc (BD), with the video signal being subsequently displayed in the display region of a display apparatus. For example, consider the case wherein a wide panoramic image like that shown in FIG. 1 is used as the giant image data, and wherein this giant image data is displayed moving in constant direction at constant speed.

First, source data is generated for displaying the giant image data moving in a constant direction at constant speed. For example, a progressive video signal having a frame rate of 30 Hz (hereinafter referred to as 30p) may be generated. The wide panoramic images shown in FIG. 1 may then be moved horizontally in predetermined integer units of pixels (such as 1 or 2 pixels) and synched to 1/30 seconds, for example. In so doing, a 30p video signal (hereinafter referred to as the source data) can be generated from the giant image data.

Next, a 60i video signal is generated from the 30p source data to comply with the format playable by the playback apparatus. The 60i video signal can be generated by dividing single frames in the 30p source data into two fields. For example, the fields 1a and 1b in the 60i video signal can be generated from the frame 1 in the 30p source data, as shown in FIG. 2. Similarly, the fields 2a and 2b in the 60i video signal can be generated from the frame 2 in the 30p source data.

In the display apparatus, the 60i video signal thus generated is converted into a 60p video signal. When converting a video signal from 60i to 60p in the first embodiment of the present invention, 2-2 pulldown is used instead of ordinary I/P conversion. With 2-2 pulldown, a single frame of a 60p video signal is generated from a single field of a 60i video signal. As shown by way of example in FIG. 2, the frame 1 in the 60p video signal is generated from the field 1a in the 60i video signal, while the 60p frame 2 is generated from the 60i field.

At this point, consecutive fields in the 60i video signal used to generated single frames by 2-2 pulldown are identical image data. Consequently, by converting the 60i video signal to a 60p video signal by 2-2 pulldown, the 30p video signal constituting the original source data can be played back.

Figure 3:
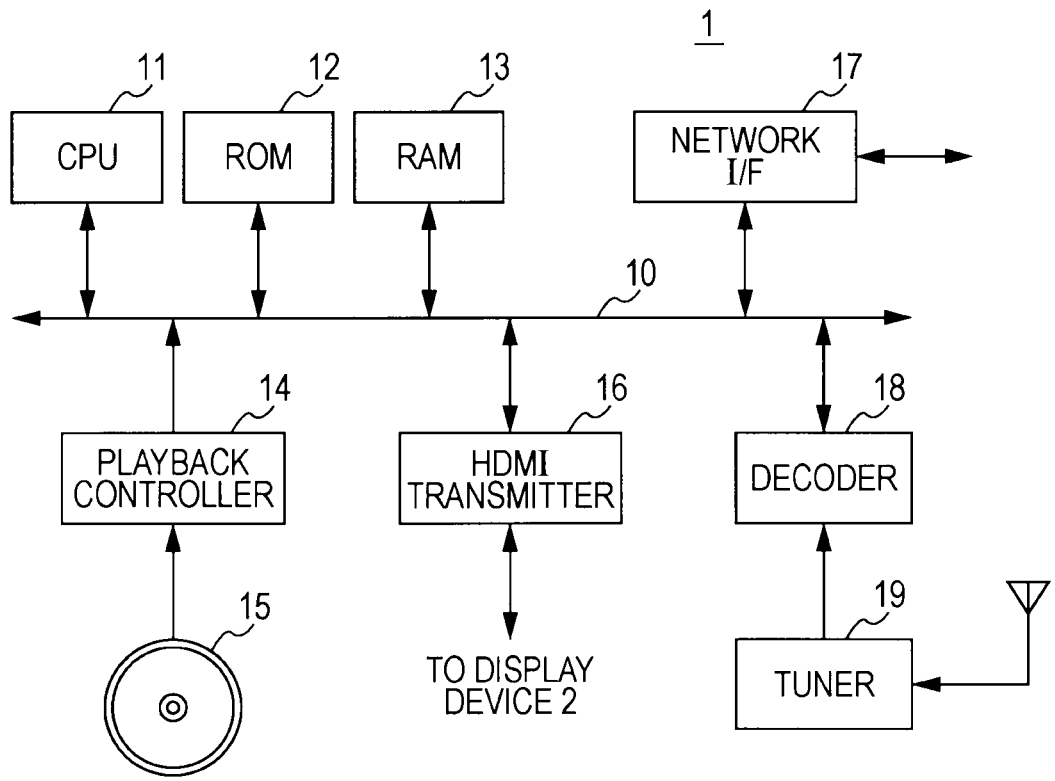
FIG. 3 is a block diagram illustrating an exemplary configuration of a playback apparatus to which a first embodiment of the present invention may be applied.

FIG. 3 illustrates an exemplary configuration of a playback apparatus 1 to which the first embodiment of the present invention can be applied. The playback apparatus 1 is provided with a central processing unit (CPU) 11, a playback controller 14, a High Definition Multimedia Interface (HDMI) transmitter 16, a network interface (I/F) 17, and a decoder 18, each connected via a bus 10. For the sake of simplicity, portions not directly related to an embodiment of the present invention have been omitted from the drawings, and will not be described herein.

Following a program stored in advance in read-only memory (ROM) 12, the CPU 11 controls the respective components of the playback apparatus 1, using random access memory (RAM) 13 as work memory during program execution.

A recording medium 15 is connected to the playback controller 14. The playback controller 14 controls the playback of data recorded onto the recording medium 15. The playback controller 14 reads a 60i video signal generated from source data in the form of a 30p video signal from the recording medium 15, and supplies the 60i video signal to the HDMI transmitter 16. The recording medium 15 may be an optical disc such as a BD or Digital Versatile Disc (DVD), for example. The recording medium 15 may also be removable non-volatile memory or a hard disk. It is furthermore possible to apply magnetic tape, which was used to record video data in earlier related art, as the recording medium 15.

The HDMI transmitter 16 supplies the video signal supplied by the playback controller 14 to an HDMI receiver 24 provided in a display apparatus 2 to be hereinafter described. Details regarding the communication between the HDMI transmitter 16 and the HDMI receiver 24 will be given later.

The network I/F 17 is connected to an external network such as the Internet by means of a wired or wireless local area network (LAN), and communicates with external apparatus according to a predetermined protocol.

A tuner 19 is connected to the decoder 18. The tuner 19 selects a signal on a predetermined frequency from among the electromagnetic waves of a digital television or similar broadcast received via an antenna. Subsequently, the tuner 19 subjects the signal to predetermined signal processing such as demodulation and error correction, extracts an appropriate stream from the transport stream (TS) obtained thereby, and then supplies the result to the decoder 18. The decoder 18 decodes the compressed video signal contained in the stream supplied by the tuner 19 in a predetermined way, and outputs the resulting video signal.

Figure 4:
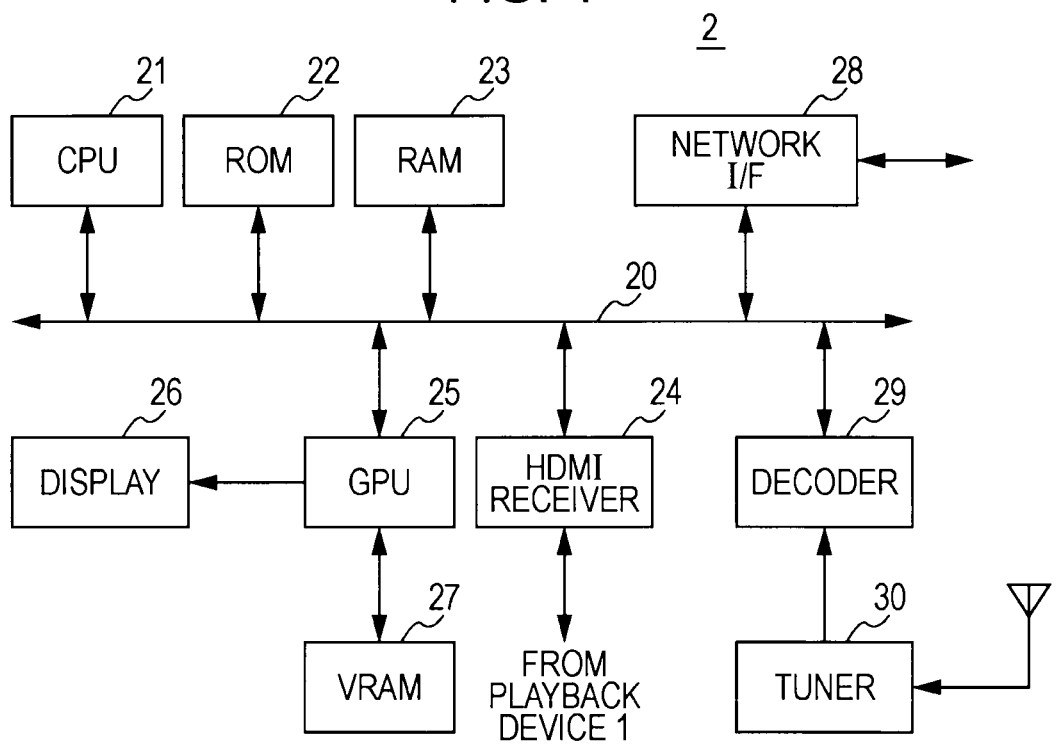
FIG. 4 is a block diagram illustrating an exemplary configuration of a display apparatus to which a first embodiment of the present invention may be applied.

FIG. 4 illustrates an exemplary configuration of a display apparatus 2 to which the first embodiment of the present invention can be applied. The display apparatus 2 is provided with a CPU 21, the HDMI receiver 24, a graphics processing unit (GPU) 25, a network I/F 28, and a decoder 29, each connected via a bus 20.

Following a program stored in advance in ROM 22, the CPU 21 controls the respective components of the display apparatus 2, using RAM 23 as work memory during program execution. The HDMI receiver 24 receives a 60i video signal from the HDMI transmitter 16 provided in the playback apparatus 1.

A display 26 and video random access memory (VRAM) 27 are connected to the GPU 25. Using the VRAM 27, the GPU 25 performs 2-2 pulldown with respect to the 60i video signal generated from source data in the form of a 30p video signal, and thereby generates a 60p video signal. Subsequently, the GPU 25 displays the generated 60p video signal on the display 26. The display 26 may be a liquid crystal display (LCD), a plasma display panel (PDP), an organic electroluminescence (EL) display, or a cathode ray tube (CRT) display, for example.

The network I/F 28 is connected to an external network such as the Internet by means of a wired or wireless local area network (LAN), and communicates with external apparatus according a predetermined protocol.

A tuner 30 is connected to the decoder 29. The tuner 30 selects a signal on a predetermined frequency from among the electromagnetic waves of a digital television or similar broadcast received via an antenna. Subsequently, the tuner 30 subjects the signal to predetermined signal processing such as demodulation and error correction, extracts an appropriate stream from the transport stream (TS) obtained thereby, and then supplies the result to the decoder 29. The decoder 29 decodes the compressed video signal contained in the stream supplied by the tuner 30 in a predetermined way, and outputs the resulting video signal.

Figure 5:
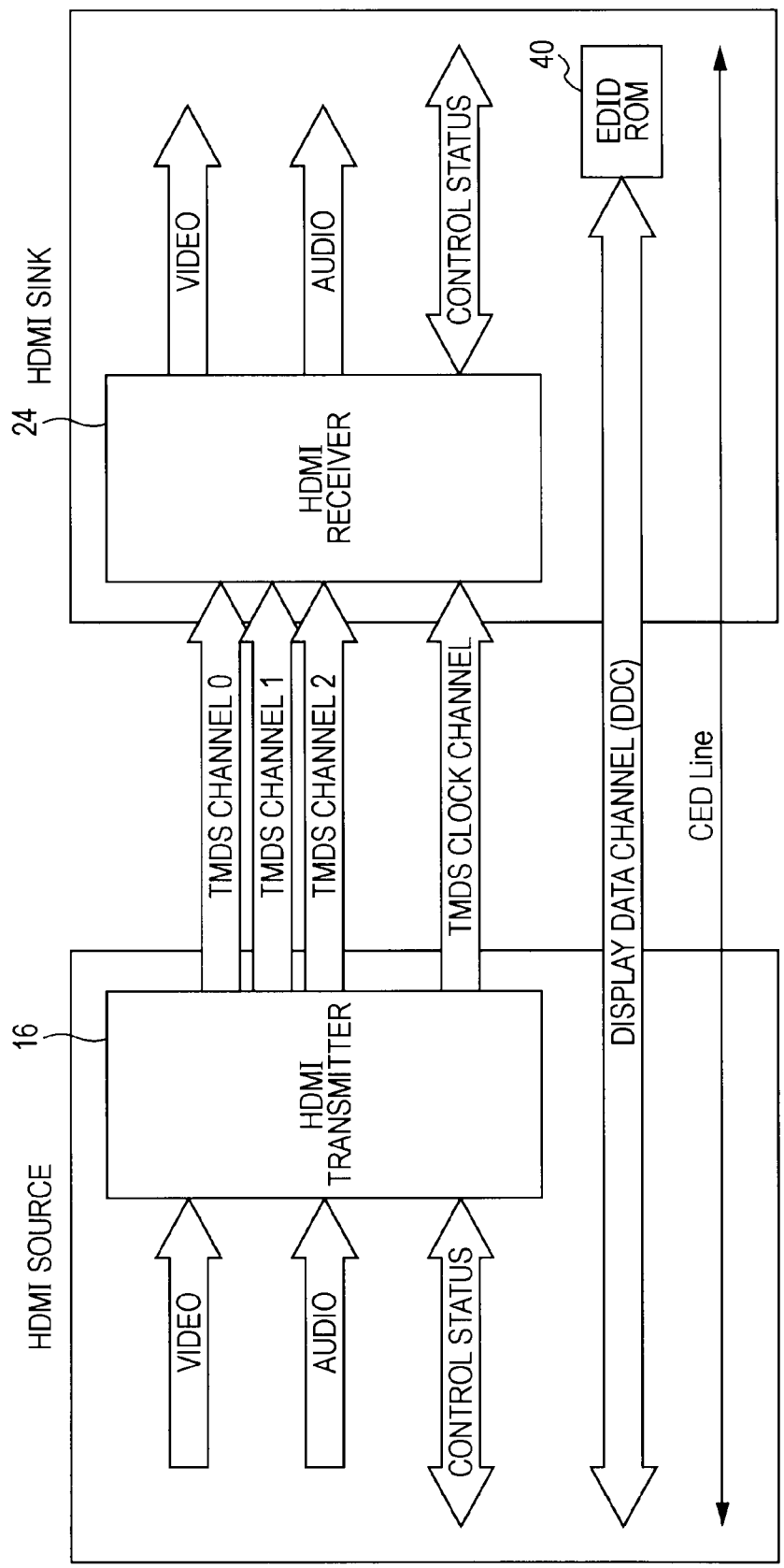
FIG. 5 is a schematic diagram for explaining communication over HDMI.

FIG. 5 schematically illustrates communication conducted between the HDMI transmitter 16 provided in the playback apparatus 1 (i.e., the source equipment) and the HDMI receiver 24 provided in the display apparatus 2 (i.e., the sink equipment). A picture data signal is transmitted from the HDMI transmitter 16 using Transition Minimized Differential Signaling (TMDS) channels 0 to 2, and received by the HDMI receiver 24. In addition, a clock signal is transmitted from the HDMI transmitter 16 using the TMDS clock channel, and received by the HDMI receiver 24. On the basis of the received signals, the HDMI receiver 24 generates and outputs a video signal and an audio signal.

Meanwhile, the display apparatus 2 also includes ROM 40 that stores device-specific information for the display apparatus 2, such as the vendor name, serial number, and resolution. The playback apparatus 1 (i.e., the transmitter of the HDMI signal) communicates with the display apparatus 2 using the Display Data Channel (DDC), and acquires the apparatus-specific information stored in the ROM 40. The data format of the device-specific information is prescribed as Extended Display Identification Data (EDID). The information on the DDC is transmitted over a common cable together with the information on the TMDS channels 0 to 2 and the TMDS clock channel.

Upon receiving a 60i video signal generated from 30p source data and output from the playback apparatus 1, an ordinary display apparatus would perform typical I/P conversion similar to that for an ordinary video signal, and image quality may suffer as a result. For this reason, it is desirable to notify the display apparatus that the video signal output from the playback apparatus is using 30p source data.

Thus, in the first embodiment of the present invention, speed information indicating the frame rate of the source data for the 60i video signal is stated in the BD header, for example, and issued to the display apparatus.

Figure 6:
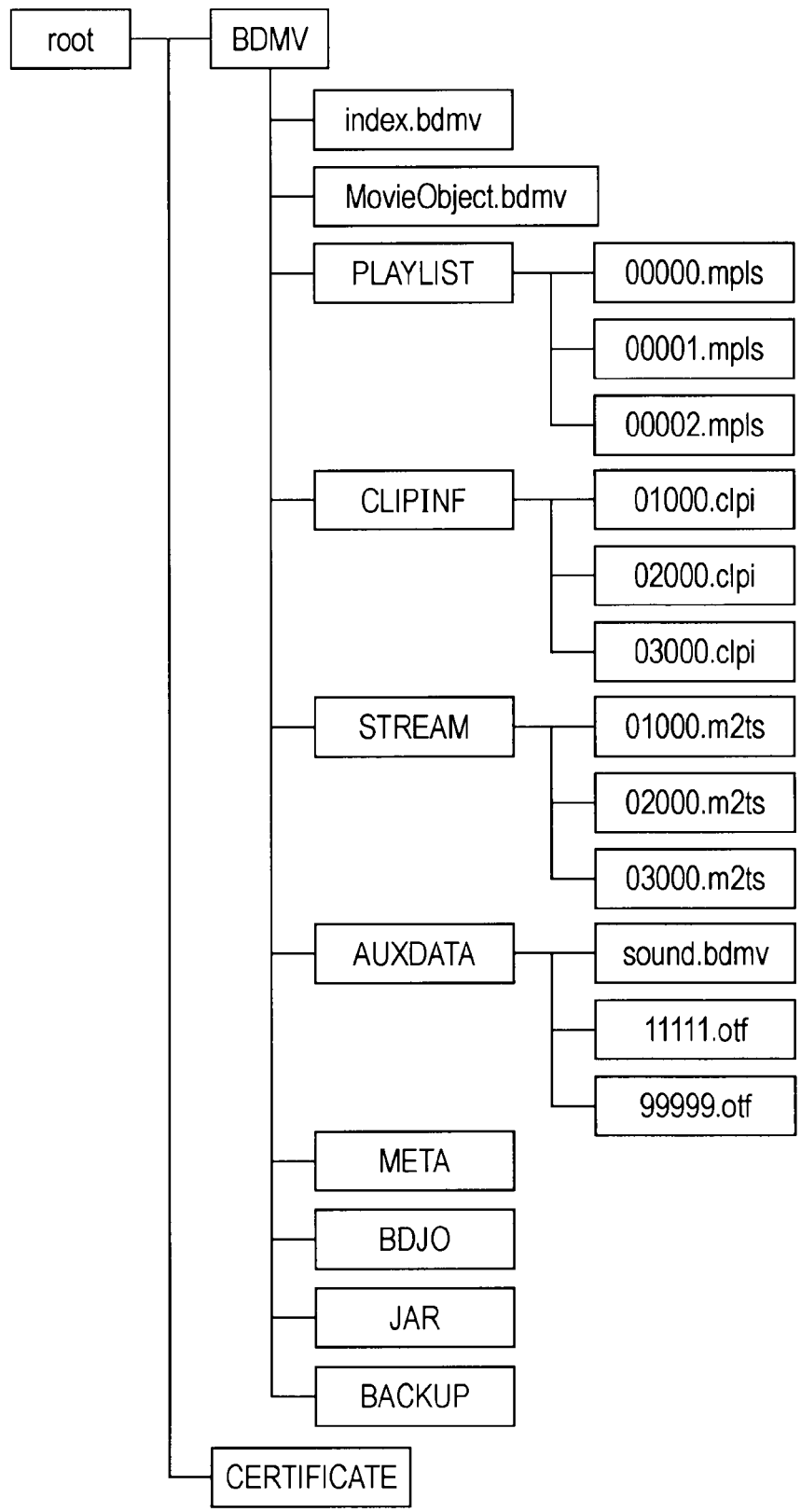
FIG. 6 is a schematic diagram for explaining the management structure of files recorded onto a recording medium.

The management structure of files recorded onto a BD will now be summarized with reference to FIG. 6. It should be appreciated that detailed description of portions not directly related to an embodiment of the present invention will be omitted herein. Files are managed in a layered manner by means of a directory structure. First, a single directory is created on the recording medium (i.e., the root directory in the example shown in FIG. 6). The contents of this directory are taken to be the range managed by a single recording and playback system.

Within the root directory, there exist "BDMV" and "CERTIFICATE" directories. Copyright-related information is stored in the "CERTIFICATE" directory.

Only two files may be placed within the "BDMV" directory, an "index.bdmv" file and a "MovieObject.bdmv" file. In addition, the "BDMV" directory also contains a "PLAYLIST" directory, a "CLIPINF" directory, a "STREAM" directory, an "AUXDATA" directory, a "META" directory, a "BDJO" directory, a "JAR" directory, and a "BACKUP" directory.

The "PLAYLIST" directory contains the playlist database. In other words, the "PLAYLIST" directory contains movie playlist-related files in the form "xxxxx.mpls". A single "xxxxx.mpls" file is created for each movie playlist. The filename "xxxxx" is a 5-digit number, while the ".mpls" extension is a fixed extension for files of this type.

The "CLIPINF" directory contains the clip database. In other words, the "CLIPINF" directory contains clip information files in the form "zzzzz.clpi", corresponding to each clip audio/video (AV) stream file. The filename "zzzzz" is a 5-digit number, while the ".clpi" extension is a fixed extension for files of this type.

The "STREAM" directory contains the actual AV stream files. In other words, the "STREAM" directory contains the clip AV stream files corresponding to each clip information file. A clip AV stream file is made up of a Moving Pictures Experts Group 2 (MPEG-2) transport stream (hereinafter abbreviated to MPEG-2 TS), and is named in the form "zzzzz.m2ts". The filename "zzzzz" is the same 5-digit number as that of its corresponding clip information file, enabling one to easily grasp the relationship between each clip information file and each clip AV stream file.

FIG. 7 illustrates the syntax expressing the structure of an exemplary clip information file. The syntax herein is based on C, the programming language used for computers and similar apparatus. The other syntax illustrated in the drawings included in this specification are similar. The type_indicator field has a data length of 32 bits (4 bytes), and indicates that the current file is a clip information file. The version_number field has a data length of 32 bits (4 bytes), and indicates the clip information file version.

The clip information file also includes a ClipInfo( ) block, a SequenceInfo( ) block, a ProgramInfo( ) block, a CPI( ) block, a ClipMark( ) block, and an ExtensionData( ) block. The start address of each block is indicated in a corresponding 32-bit field: a SequenceInfo_start_address field, a ProgramInfo_start_address field, a CPI_start_address field, a ClipMark_start_address field block, and an ExtensionData_start_address field, respectively.

The ProgramInfo( ) block states information such as the coding format for the clip AV stream managed by the current clip information file, as well as the aspect ratio of the video data in the clip AV stream. The ProgramInfo( ) block also states data in accordance with the first embodiment of the present invention.

FIG. 8 illustrates the syntax expressing the structure of an exemplary ProgramInfo( ) block. The Length field has a data length of 32 bits, and indicates the data length of the data beginning immediately after the Length field and ending with the end of the ProgramInfo( ) block. The StreamCodingInfo (stream_index) block states information related to the coding format of the elementary stream indicated by the corresponding stream_PID[stream_index] field.

FIG. 9 illustrates the syntax expressing the structure of an exemplary StreamCodingInfo(stream_index) block. The Length field has a data length of 8 bits, and indicates the data length of the data beginning immediately after the Length field and ending with the end of the StreamCodingInfo(stream_index) block.

After the Length field, there is an 8-bit stream_coding_type field. In the stream_coding_type field, the type of the coding used in the elementary stream is indicated by a [stream_index] value. Herein, the values in the stream_coding_type field are defined to be "0x2B", "0x1B", "0xEA", "0x80" to "0x86", "0xA1", "0xA2", and "0x90" to "0x92", by way of example. Following the subsequent if statement, information is stated depending on the value of the stream_coding_type field. Herein, the "0x" in the values indicate that the values are expressed in hexadecimal. This also applies to similar expressions hereinafter.

If the value of the stream_coding_type field is "0x02", "0x1B", or "0xEA", for example, and if the elementary stream indicated by the [stream_index] value is indicated to be a video stream, then the video_format field, the frame_rate field, and the aspect_ratio field are stated following the if statement. In addition, a cc_flag flag is stated via a 2-bit reserved_for_future_use region. After the cc_flag flag, there is another reserved_for_future_use region having a data length of 17 bits.

The video_format field has a data length of 4 bits, and indicates the format of the video data indicated by the [stream_index] value. FIG. 10 shows a list of exemplary video data formats indicated in the video_format field. As shown by way of example in FIG. 10, the format of the video data is identified by 4 bits expressing possible values from 0 to 15, wherein the value 0 and the values 8 to 15 are reserved. The values 1 to 7 indicate the video data formats 480i, 576i, 480p, 1080i, 720p, 1080p, and 576p, respectively.

The above video formats are the formats standardized by the International Telecommunication Union (ITU)-R BT.601-4 (576i), ITU-R BT.601-5 (480i), ITU-R BT.1358 (576p), and the Society of Motion Picture and Television Engineers (SMPTE) 293M (480p), SMPTE 274M (1080i and 1080p), and SMPTE 296M (720p).

In the StreamCodingInfo(stream_index) block, the frame_rate field has a data length of 4 bits, and indicates the frame rate of the video data indicated by the [stream_index] value. FIG. 11 shows a list of exemplary frame rates indicated in the frame_rate field. As shown by way of example in FIG. 11, the frame rate of the video data is identified by 4 bits expressing possible values from 0 to 15, wherein the values 0, 5, and 8 to 15 are reserved. The values 1 to 4 indicate frame rates of (24000/1001) Hz or approximately 23.97 Hz, 24 Hz, 25 Hz, and (30000/1001) Hz or approximately 29.97 Hz, respectively. The values 6 and 7 indicate frame rates of 50 Hz and (60000/1001) Hz or approximately 59.94 Hz, respectively.

Figures 12A, 12B, 12C, 13:
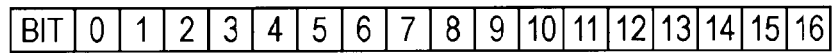
FIG. 12A is a schematic diagram for explaining how speed information is stated.
FIG. 12B is a schematic diagram for explaining how speed information is stated.
FIG. 12C is a schematic diagram for explaining how speed information is stated.
FIG. 13 is a schematic diagram for explaining a packet header transmitted over HDMI.

In the first embodiment of the present invention, speed information is stated in the 17-bit reserved_for_future_use region (see FIG. 12A) following the cc_flag, for example. Among these bits (from a 0th bit to a 16th bit), the 0th bit indicates the relationship between the movement speed (i.e., the frame rate) of the source data and the frame rate of the video signal. As shown in FIG. 12B, a value of 0 in the 0th bit indicates that the speed (i.e., the frame rate) of the source data matches the frame rate of the video signal. A value of 1 in the 0th bit indicates that the speed (i.e., the frame rate) of the source data differs from the frame rate of the video signal. For example, when a 60i video signal is based on 30p source data, the frame rate of the video signal is 60 Hz, while the frame rate of the source data is 30 Hz. The respective frame rates thus differ from one another, and the 0th bit takes a value of 1.

In addition, the speed of the source data is identified by a value expressible using the 1st through 8th bits. As shown in FIG. 12C, the value expressed by the 1st through 8th bits indicates the reciprocal of the time elapsed when moving the source data by one pixel. In other words, the value expressed by the 1st through 8th bits indicates the frame rate of the source data. For example, if the source data is being moved by one pixel every 1/30 seconds, then a value of 30 is expressed by the 1st through 8th bits.

When speed information stated in a BD is issued from the playback apparatus 1 to a display apparatus in this way in the first embodiment of the present invention, HDMI is used. According to the HDMI standard, a video signal is transmitted together with a packet, referred to as an InfoFrame, that contains various information. The InfoFrame is transmitted during the blanking intervals of the video signal (i.e., vertical blanking interval and the horizontal blanking interval). Thus, in the first embodiment of the present invention, this InfoFrame is used to transmit speed information from the playback apparatus 1 to the display apparatus 2.

FIG. 13 illustrates the structure of the header of a packet (i.e., a packet header) transmitted by HDMI. The packet header is made up of 24 bits of data, with 8 bits indicating the packet type, and the remaining 16 bits indicating packet-specific data. The value of the packet type can be used to determine the kind of information stored in the packet.

FIG. 14 illustrates packet types according to packet type values. For example, a packet type starting with 0x80 (or in other words, an 8-bit value having a most significant bit value of 1) indicates that the packet is an InfoFrame. The remaining 7 bits indicate the InfoFrame type.

A packet type value of 0x81 indicates that the packet is a vendor-specific InfoFrame. A vendor-specific InfoFrame is able to store information particular to a specific vendor. In the first embodiment of the present invention, the speed information is stored in a vendor-specific InfoFrame.

A method for determining how to process a video signal in the display apparatus 2 will now be described. On the basis of speed information stored in a vendor-specific InfoFrame existing among the InfoFrames received from the playback apparatus 1, the display apparatus 2 determines how to process the received video signal.

The display apparatus 2 has a table stored in advance that indicates relationships between speeds (i.e., frame rates) of source data for received video signals and types of processing conducted in the display apparatus 2. The table stored in advance in the display apparatus 2 associates particular source data speeds (i.e., frame rates) with particular processing in the display apparatus 2. For example, if the source data speed is 30 Hz or 60 Hz, then 2-2 pulldown is associated as the processing to be performed with respect to the video signal.

Consequently, on the basis of speed information received from the playback apparatus 1, the display apparatus 2 references the table and determines how to process the video signal.

Figure 16:
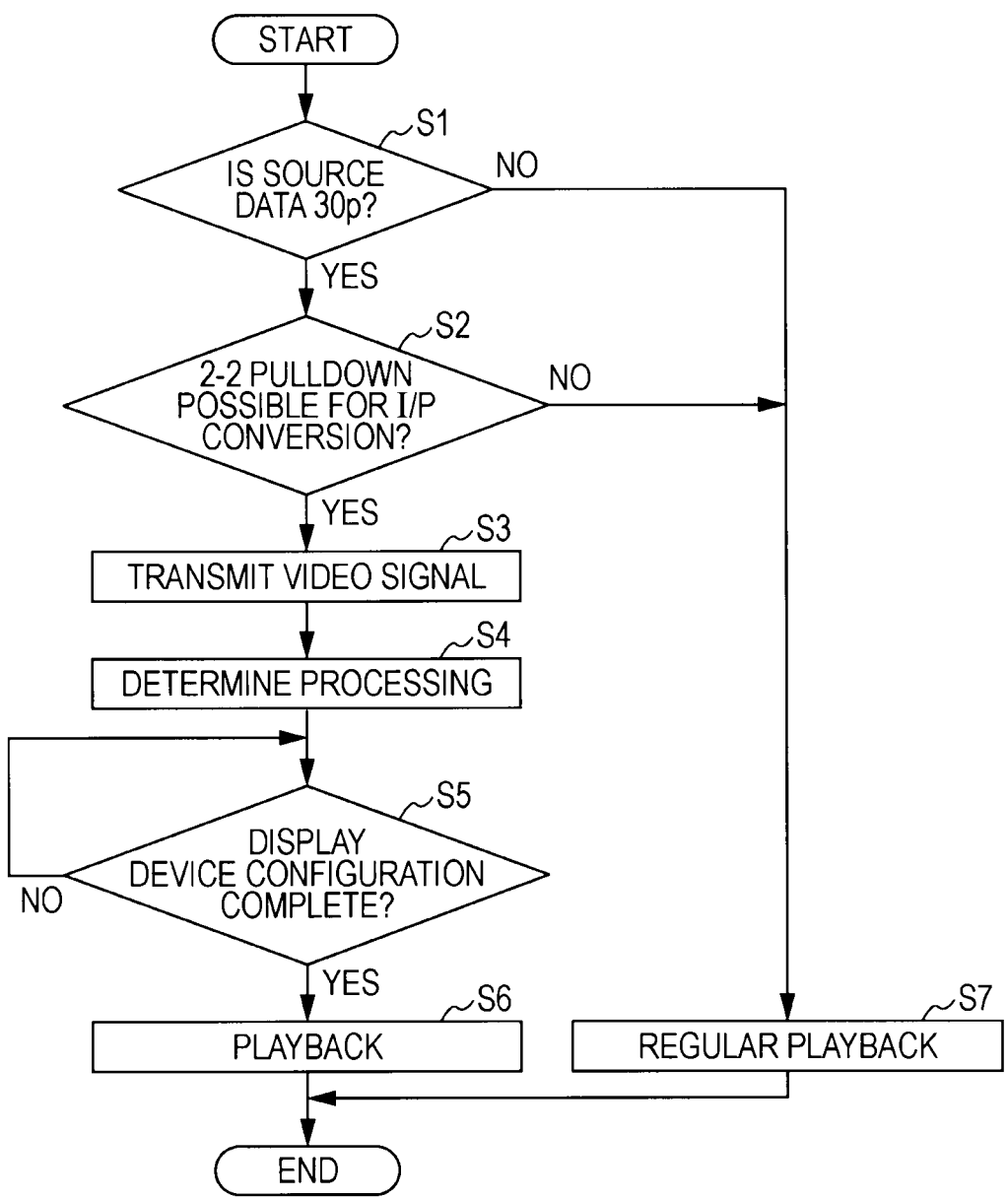
FIG. 16 is a flowchart illustrating the flow of an exemplary image display process in accordance with the first embodiment of the present invention.

FIG. 16 is a flowchart illustrating the flow of an exemplary image display process in accordance with the first embodiment of the present invention. The process illustrated in the flowchart is an example of a process executed when playing back a video signal made up of source data generated by moving a panoramic image or similar giant image data in a constant direction at constant speed. Herein, the case of playing back a video signal made up of 30p source data is described by way of example.

In step S1, it is determined whether or not the 60i video signal recorded onto the recording medium 15 is based on 30p source data. If it is determined that the source data is a 30p video signal, then the process transitions to step S2. In step S2, it is determined whether or not 2-2 pulldown can be executed for I/P conversion in the display apparatus 2, and if so, the process transitions to step S3.

In step S3, the playback apparatus 1 reads the 60i video signal recorded onto the recording medium 15 that is based on the 30p source data. In addition, the playback apparatus 1 also reads the speed information indicating the source data frame rate from the header of the 60i video signal, and stores the speed information in an HDMI vendor-specific InfoFrame. Subsequently, the 60i video signal and the speed information are transmitted from the playback apparatus 1 to the display apparatus 2 via the HDMI transmitter 16. In the display apparatus 2, the 60i video signal and the speed information transmitted from the playback apparatus 1 are supplied via the HDMI receiver 24.

In step S4, the display apparatus 2 references the table shown in FIG. 15 that has been stored in advance, and determines how to process the 60i video signal on the basis of the speed information stored in the supplied vendor-specific InfoFrame. For example, if the speed (i.e., the frame rate) of the source data for the 60i video signal is 30 Hz, then 2-2 pulldown is determined as the processing to be executed for I/P conversion.

In step S5, the display apparatus 2 configures itself for 2-2 pulldown. When configuration for 2-2 pulldown is completed, the process transitions to step S6. However, if configuration for 2-2 pulldown is not yet complete, the process returns to step S5, and the display apparatus 2 again configures itself for 2-2 pulldown.

In step S6, the display apparatus 2 I/P converts the 60i video signal received from the playback apparatus 1 by performing 2-2 pulldown, and displays the 60p video signal generated as a result on the display 26.

In contrast, if it is determined in step S1 that the source data is not a 30p video signal, or if it is determined in step S2 that 2-2 pulldown is not available for I/P conversion, then the process transitions to step S7. In step S7, the display apparatus 2 performs ordinary I/P conversion with respect to the received 60i video signal, and displays the 60p video signal generated as a result on the display 26.

In this way, when a 60i video signal is generated from 30p source data in the first embodiment of the present invention, the 60i video signal is subjected to 2-2 pulldown, thereby enabling playback of the 30p video signal constituting the original source data. Consequently, panoramic images or similar giant image data can be cleanly played back.

It should be appreciated that although the present example describes the 60i video signal for playback being recorded onto a recording medium, the present invention is not limited thereto. For example, it is also possible to apply an embodiment of the present invention to the case wherein a video signal based on 30p source data is supplied by a broadcast signal sent from a digital broadcasting system by terrestrial digital or other broadcasting method.

Figure 17:
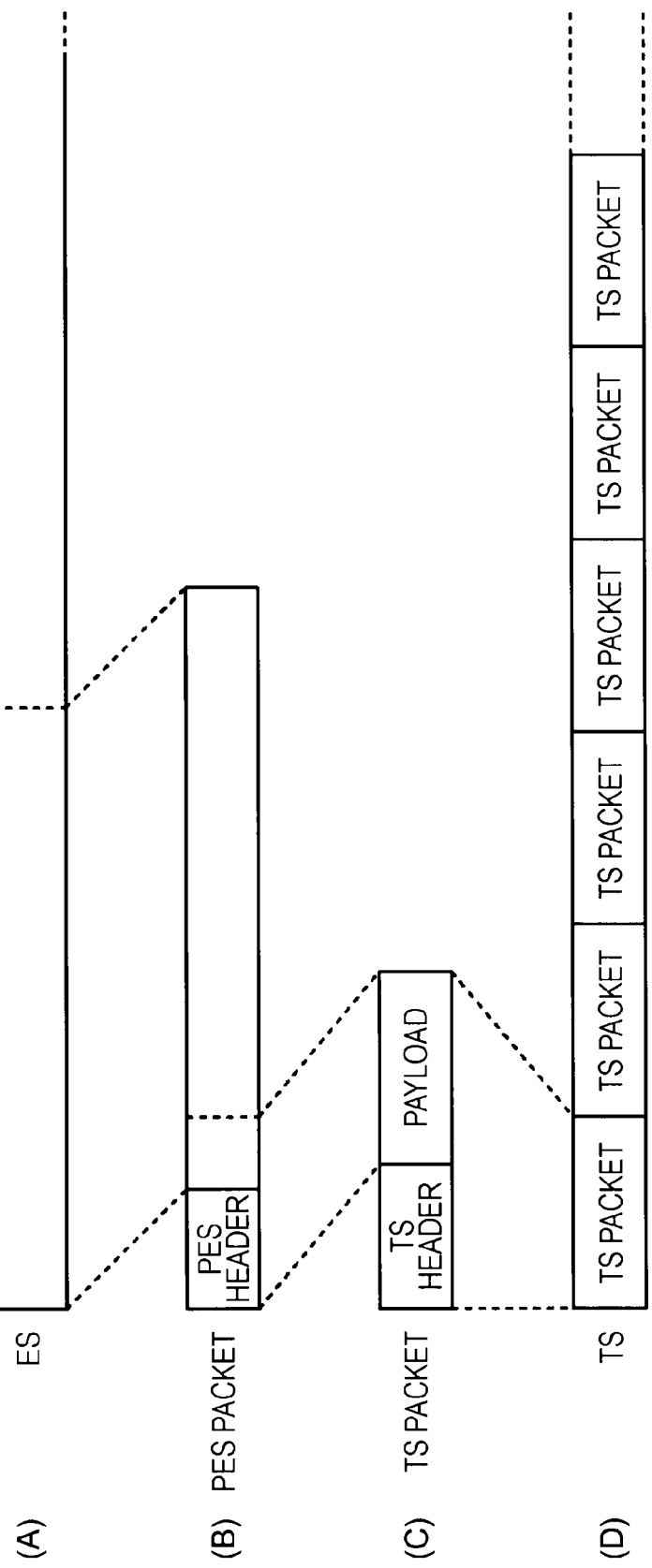
FIG. 17 is a schematic diagram for explaining a signal transmitted by digital broadcast.

In a terrestrial digital broadcast or other digital broadcasting system, a transport stream (hereinafter referred to as a TS) is used to transmit both video signals and audio signals by time-division multiplexing, in accordance with MPEG-2 systems. As a more specific example, a video signal or other elementary stream (ES) is divided into chunks of predetermined size, as shown in FIG. 17A. Headers are then attached to each chunk, and the result is packetized into a packetized elementary stream (PES), as shown in FIG. 17B. The PES packets are themselves divided and stuffed into the payload areas of fixed-length transport packet (TS packets), as shown in FIG. 17C. Subsequently, the generated TS packets are time-division multiplexed and sent as a TS, as shown in FIG. 17D.

In this case, the speed information regarding the source data of the 60i video signal can be stated in the header attached to the PES packet, for example. FIG. 18 illustrates a PES packet header. The numerical values shown in parenthesis in each region indicate the bit length of that region. The header of the PES packet is made up of "Packet Start Code", "Flags and Controls", "Packet Length", "PES Header Length", and "Conditional Coding" regions.

The speed information is stated in the "Other" region of the "Conditional Coding" region, wherein conditionally coded items are placed corresponding to various flag types collected in the "Flags and Controls" region. As shown in FIG. 19, various information is stated in the "Other" region. The speed information may be stated in the "Extended Data" region, for example.

The speed information is made up of 9 bits from a 0th bit to an 8th bit, as shown by way of example in FIG. 20A. The 0th bit indicates the relationship between the movement speed (i.e., the frame rate) of the source data and the frame rate of the video signal. As shown in FIG. 20B, a value of 0 in the 0th bit indicates that the speed (i.e., the frame rate) of the source data matches the frame rate of the video signal. A value of 1 in the 0th bit indicates that the speed (i.e., the frame rate) of the source data differs from the frame rate of the video signal. For example, when a 60i video signal is based on 30p source data, the frame rate of the video signal is 60 Hz, while the frame rate of the source data is 30 Hz. The respective frame rates thus differ from one another, and the 0th bit takes a value of 1.

In addition, the speed of the source data is identified by a value expressible using the 1st through 8th bits. As shown in FIG. 20C, the value expressed by the 1st through 8th bits indicates the reciprocal of the time elapsed when moving the source data by one pixel. For example, if the source data is being moved by one pixel every $\frac{1}{30}$ seconds, then a value of 30 is expressed by the 1st through 8th bits.

The operations performed when playing back a video signal supplied by a broadcast signal will now be described. A TS sent from a digital broadcasting system is received via an antenna of the playback apparatus 1, and an appropriate stream is extracted from the TS by the tuner 19. The 19 detects packet identifications (PIDs) for identifying TS packets from the headers of the TS packets in the supplied TS, and sorts the TS packets according the type of data stored in the payloads. The data stored in the payloads is then extracted from each of the sorted TS packets to construct a PES packet. The tuner 19 then acquires the speed information stated in the header of the PES packet, and supplies the speed information to the HDMI transmitter 16. Additionally, the tuner 19 extracts the data in the payload of the PES packet, appends header or other information on the basis of information stored in the PES header, and outputs a single elementary stream.

The elementary stream output from the tuner 19 is decoded in a predetermined manner in the decoder 18, and a video signal is output. The video signal and speed information thus acquired are then transmitted to the display apparatus 2 via the HDMI transmitter 16.

On the basis of the speed information received from the playback apparatus 1, the display apparatus 2 references the table and applies 2-2 pulldown to the 60i video signal to obtain and display a 60p video signal.

A second embodiment of the present invention will now be described. In the first embodiment described above, a 60i video signal is recorded onto a recording medium such as a BD. However, in addition to the above, a progressive video signal having a frame rate of 24 Hz (hereinafter referred to as 24p) can also be recorded without converting the frame rate. For example, in movie footage or similar footage created using optical film of the related art, a 24 fps picture signal is used. This corresponds to a 24p video signal. For this reason, in playback apparatus that play back a video signal recorded onto a BD, the movie footage or similar 24p video signal can be output directly.

Additionally, recent display apparatus are compatible with 24p video signal input, and the ability to display such video signals is becoming prevalent.

When using such a playback apparatus and display apparatus, the 24p video signal transmitted among apparatus is in progressive format, and thus the 24p video signal can be displayed without conducting I/P conversion. Consequently, the video signal can be displayed without image quality loss.

On the other hand, the frame rate of a 24p video signal is low compared to 60i video signals, for example. For this reason, sufficient image quality might not be obtained, due to choppy images, for example. Consequently, playback apparatus equipped with high frame rate processing functions for increasing the frame rate of the video signal in order to display playback footage more smoothly have recently become more prevalent. With high frame rate processing, single or multiple interpolated frames are generated between the original frames to increase the frame rate in the display apparatus by a factor of 2 or 4, for example.

Figure 21:
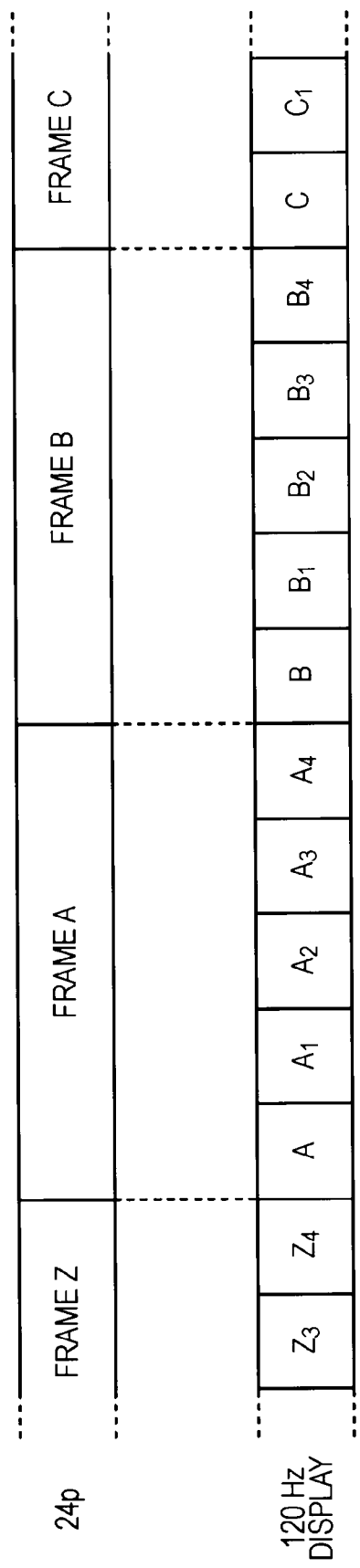
FIG. 21 is a schematic diagram for explaining high frame rate processing.

As shown by way of example in FIG. 21, four interpolated frames (frames $A_1$ to $A_4$) are generated between a single frame (frame A) and its succeeding frame (frame B) in a 24p video signal. In so doing, the frame rate in the display apparatus is raised by a factor of 5, from 24 Hz to 120 Hz.

However, it is difficult to create perfect interpolated frames when the source data is motion images such as movie footage, even when interpolating by high frame rate processing. This is due to movement of portions subjected to motion prediction and the difficulty of perfectly predicting such motion. For this reason, interpolation is only conducted to a degree that will not adversely affect the motion images, and high picture quality might not be obtained in the post-interpolation footage.

Consider the case wherein the source data is a still image such a panoramic image. In this case, since the video signal generated on the basis of the source data is a still image being moved in a constant direction at constant speed, an accurate motion vector can be detected between frames, and the motion of portions subjected to motion prediction can be easily and accurately predicted. Consequently, it is possible to generate highly precise interpolated frames using high frame rate processing.

Thus, in the second embodiment of the present invention, a 24p video signal based on giant image data as source data is subjected to high frame rate processing in the display apparatus, and interpolated frames are generated between the frames in the video signal. In so doing, the giant image data can be smoothly displayed when shown in motion.

Figure 22:
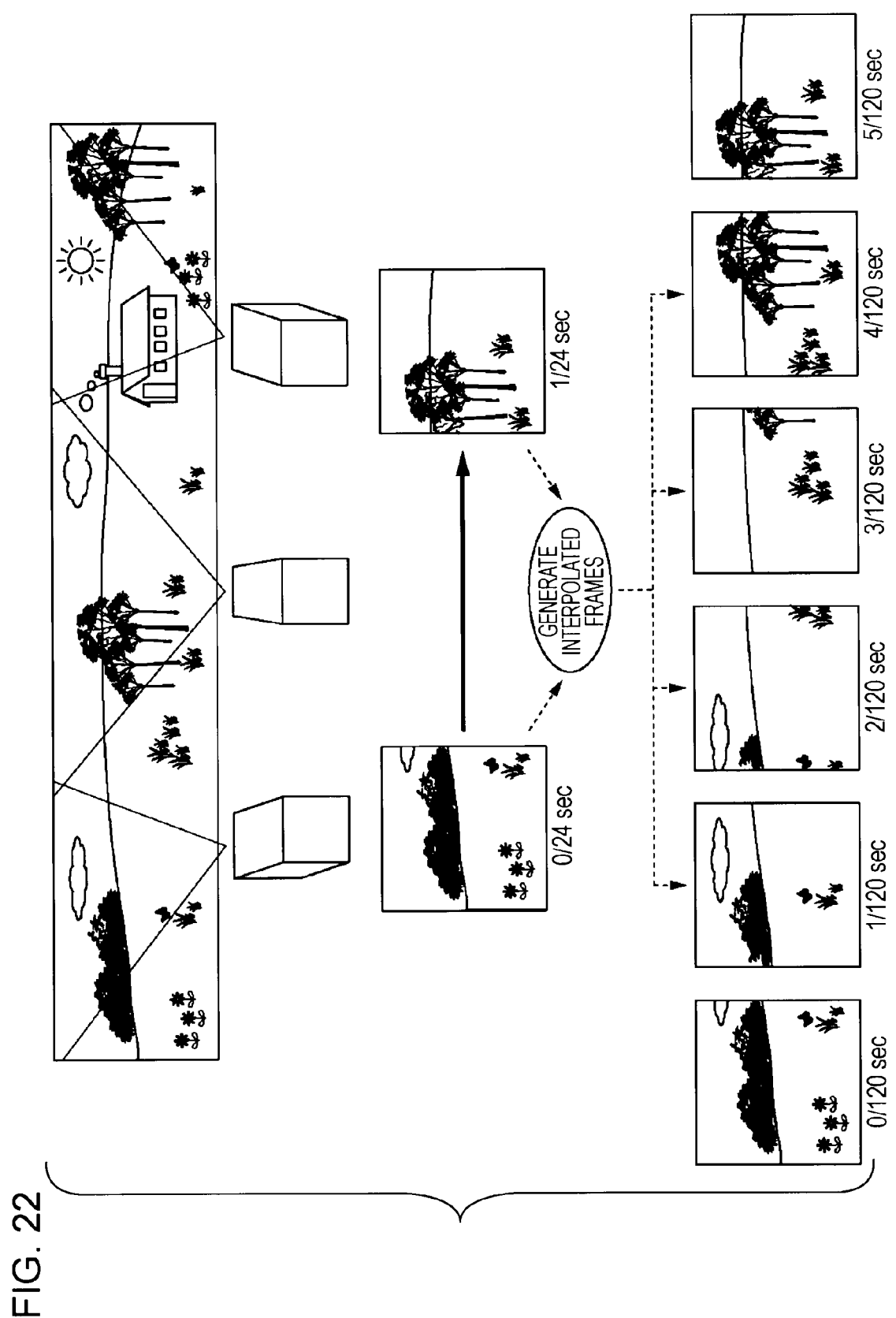
FIG. 22 is a schematic diagram for explaining high frame rate processing.

A more specific description will now be given with reference to FIG. 22. First, source data is generated in order to display the giant image data moving in a constant direction at constant speed. For example, the giant image data may be moved in a constant direction in predetermined integer units of pixels and synched to 1/24 seconds, thereby generating a 24p video signal.

In the display apparatus, high frame processing is applied to the 24p video signal and interpolated frames are generated in order to increase the frame rate by a predetermined factor. For example, if a frame rate of 24 Hz is to be increased by a factor of 5 so as to become 120 Hz, then four interpolated frames are generated between each single frame and its succeeding frame in the 24p video signal, as shown in FIG. 22.

The interpolated frames may be generated using a method similar to those that make use of MPEG-2 or the coding formats prescribed in the International Telecommunication Union—Telecommunication Standardization Sector (ITU-T) Recommendation H.264 or the International Organization for Standardization (ISO)/International Electrotechnical Commission (IEC) International Standard 14496-10 (MPEG-4 Part 10) Advanced Video Coding (hereinafter abbreviated to MPEG-4 AVC).

Figure 23:
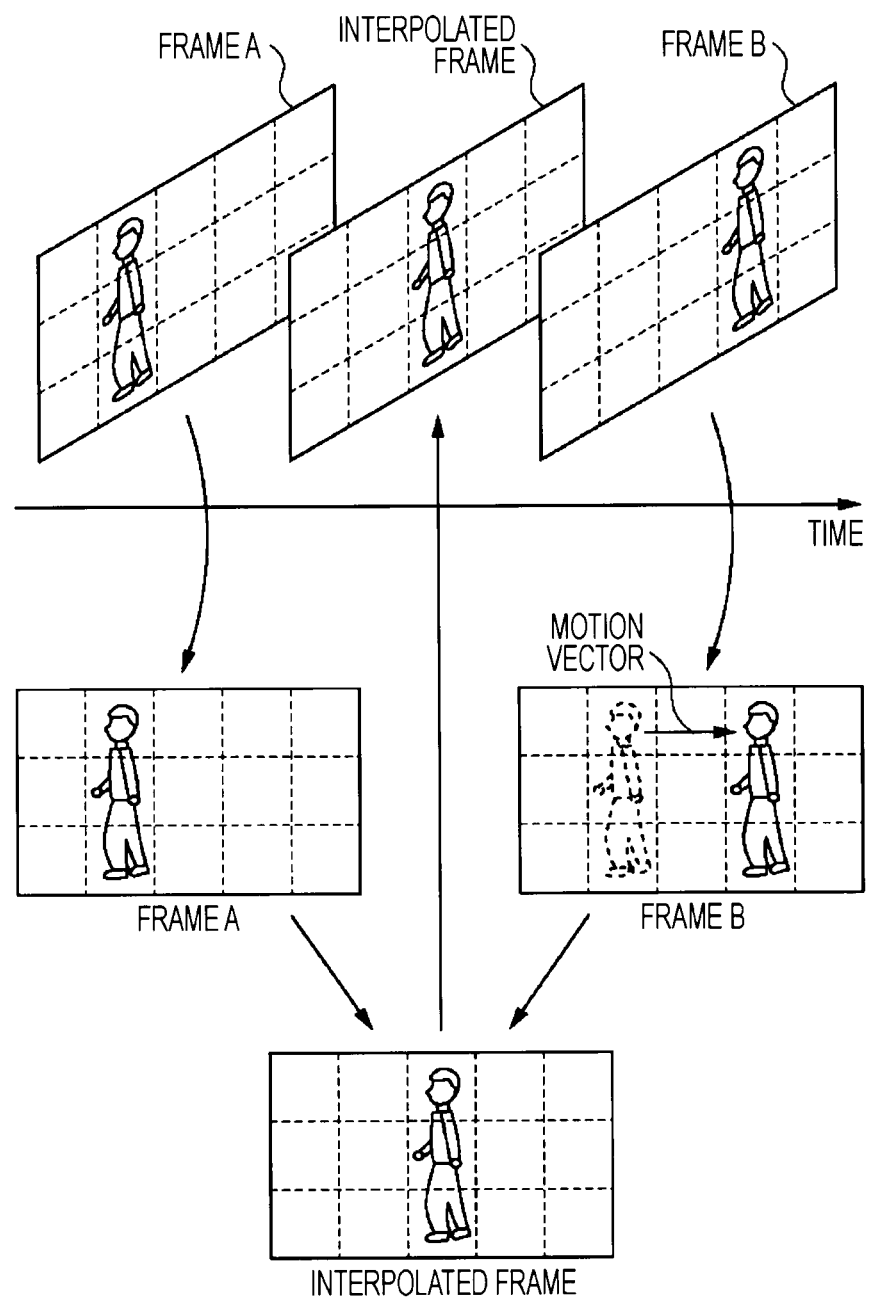
FIG. 23 is a schematic diagram for explaining a method for generating interpolated frames.

More specifically, as shown by way of example in FIG. 23, the images in a frame A and its succeeding frame B may be respectively divided into macroblocks of predetermined size, such as 16 pixels by 16 lines. On the basis of the predetermined macroblocks from the frames A and B, a motion vector is detected by means of block matching or feature point extraction, for example. Subsequently, the motion of a target portion is predicted on the basis of the detected motion vector, and an interpolated frame is generated.

At this point, the image data being used as the 24p source data is giant image data that is moved in a constant direction at constant speed. For this reason, motion vectors can be accurately detected between frames. Consequently, high-precision interpolated frames can be generated, and the 24p video signal can be played back smoothly.

It should be appreciated that the frame rate resulting from high frame rate processing is not limited to being 120 Hz, and may also be set to rates such as 72 Hz and 96 Hz. For example, if the frame rate is to be increased by a factor of 3 to yield 72 Hz after high frame rate processing, then two interpolated frames are generated. If the frame rate is to be increased by a factor of 4 to yield 96 Hz, then three interpolated frames are generated.

A playback apparatus and a display apparatus applicable to the second embodiment of the present invention will now be described. The playback apparatus applicable to the second embodiment may be the playback apparatus 1 described earlier in the first embodiment. For this reason, detailed description thereof is omitted herein.

In the second embodiment of the present invention, a 24p video signal having a panoramic image or similar giant image data as source data is recorded onto the recording medium 15. The 24p video signal is read out from the recording medium 15 by the playback controller 14, and transmitted to a display apparatus 2' (to be hereinafter described) via the HDMI transmitter 16.

Figure 24:
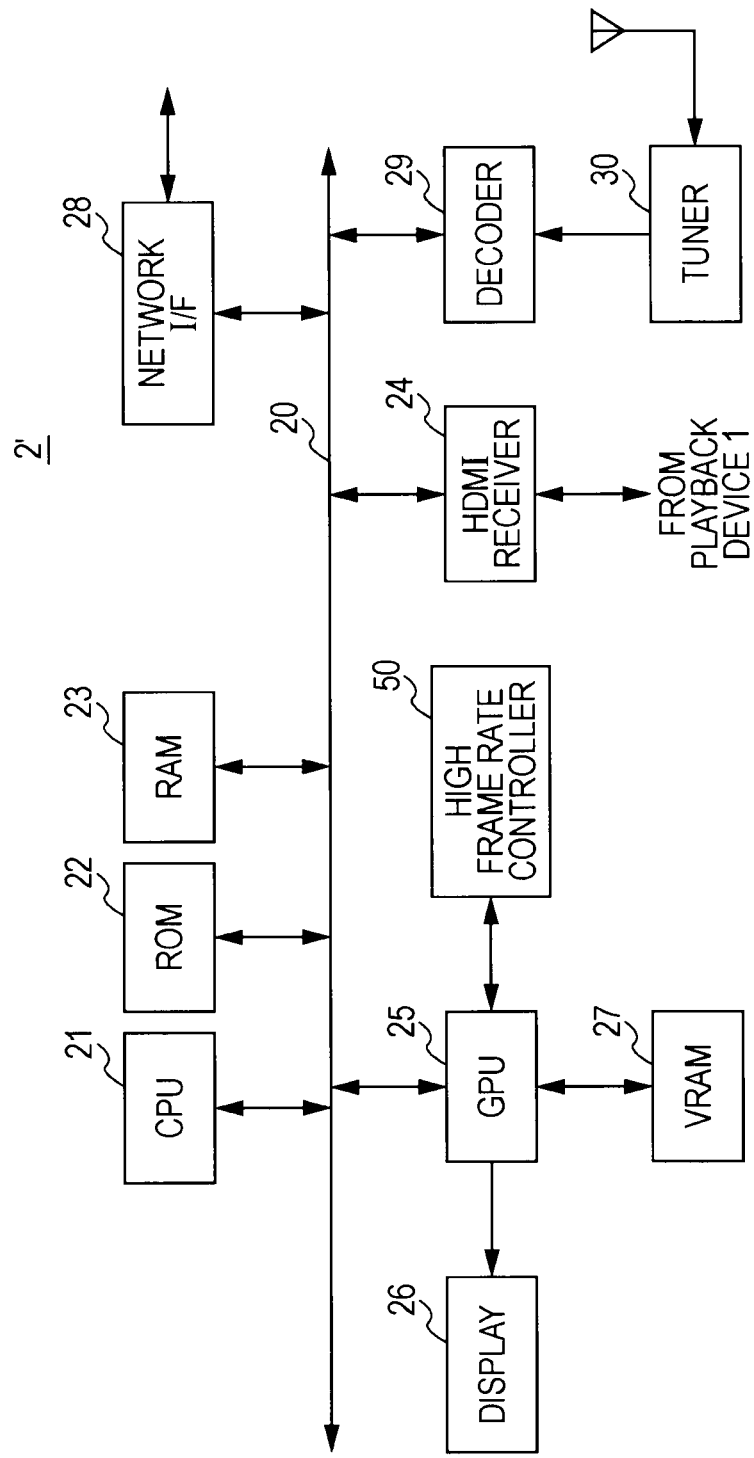
FIG. 24 is a block diagram illustrating an exemplary configuration of a display apparatus to which a second embodiment of the present invention may be applied.

FIG. 24 illustrates an exemplary configuration of a display apparatus 2' applicable to the second embodiment of the present invention. Herein, portions shared with the display apparatus 2 described with reference to FIG. 4 are identified with identical reference numbers, and further description thereof is omitted.

A high frame rate controller 50 is additionally connected to the GPU 25. On the basis of control by the CPU 21, the high frame rate controller 50 sets the frame rate of the video signal to a predetermined value. In accordance with the frame rate set by the high frame rate controller 50, the GPU 25 then generates single or multiple interpolated frames between the frames of the 24p video signal supplied from the playback apparatus 1 via the HDMI receiver 24. For example, if a frame rate of 120 Hz is set by the high frame rate controller 50, then the 24 Hz frame rate of the video signal is to be increased by a factor of 5, and thus four interpolated frames are generated.

Similarly to the first embodiment described earlier, speed information indicating the movement speed (i.e., the frame rate) of the source data is stated in a header or other location on the BD, and when the video signal is transmitted to the display apparatus 2' from the playback apparatus 1, this speed information is issued to the display apparatus 2'. The speed information is stored in an HDMI InfoFrame (a vendor-specific InfoFrame), and transmitted to the display apparatus 2' together with the video signal.

Similarly to the first embodiment described earlier, the display apparatus 2' also has a table stored in advance wherein speeds (i.e., frame rates) and types of video signal processing are associated. As shown by way of example in FIG. 15, a speed (i.e., frame rate) of 24 Hz is associated with high frame rate processing in the table as the type of video signal processing.

On the basis of speed information stored in a vendor-specific InfoFrame existing among the InfoFrames received from the playback apparatus 1 via the HDMI receiver 24, the display apparatus 2' references the table and determines how to process the video signal. For example, if the speed (i.e., frame rate) is 24 Hz, then the display apparatus 2' subjects the received video signal to high frame rate processing.

Meanwhile, the playback apparatus 1 is able to determine whether or not high frame rate processing is available in the display apparatus 2' by communicating with the display apparatus 2' using the HDMI DDC, for example. Using the DDC, the playback apparatus 1 receives device-specific information stored in the ROM 40 of the display apparatus 2'. The playback apparatus 1 then determines whether or not high frame rate processing is available on the basis of the received information.

Although the foregoing describes the display apparatus 2' as being compatible with 24p video signal input and output, it is also conceivable that some display apparatus may not be compatible with 24p video signal input and output. In such cases, a 24p video signal is not directly transmitted between the playback apparatus and the display apparatus.

Thus, when a display apparatus is used that is not compatible with 24p video signal input and output, the playback apparatus 1 first converts the 24p video signal to a 60i video signal, and transmits the result to the display apparatus. Subsequently, the display apparatus reconverts the received 60i video signal to a 24p video signal, applies high frame rate processing to the converted 24p video signal, and plays back the result.

When converting the 24p video signal to a 60i video signal in the playback apparatus 1, a process referred to as 2-3 pulldown is conducted. The frame frequency of a 24p video signal exists in a 2:5 ratio with the field frequency of a 60i video signal. Thus, 2-3 pulldown causes the frames in the 24p video signal to be output repeating twice and repeating three times, alternating each frame. In so doing, the frames are output at a field frequency of 60 Hz, thus converting the 24p video signal to a 60i video signal.

Figure 25:
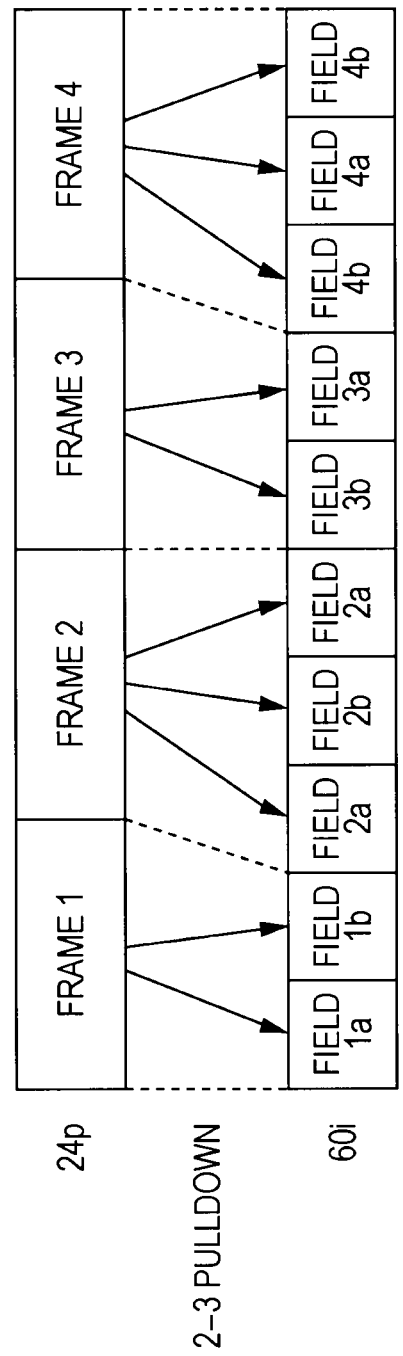
FIG. 25 is a schematic diagram for explaining 2-3 pulldown.

More specifically, as shown by way of example in FIG. 25, a frame 1 in a 24p video signal is output repeating two times, thus generating the fields 1*a* and 1*b*. Next, the frame 2 is output repeating three times, thus generating the fields 2*a*, 2*b*, and 2*a*. By successively repeating this process, the 24p video signal is converted to a 60i video signal. Herein, the letters "a" and "b" indicating respective fields are used to distinguish between odd fields and even fields.

In addition, the 60i video signal received from the playback apparatus 1 is converted to a 24p video signal in the display apparatus 2'. In this case, reverse 2-3 pulldown is used, wherein the 2-3 pulldown process is reversed. In other words, the fields 1*a* and 1*b* in the 60i video signal are used to generate the frame 1 in the 24p video signal, while the fields 2*a* and 2*b* are used to generate the frame 2.

Meanwhile, the playback apparatus 1 is able to determine whether or not the display apparatus 2' is compatible with 24p video signal input and output by communicating with the display apparatus 2' using the HDMI DDC, for example. Using the DDC, the playback apparatus 1 receives device-specific information stored in the ROM 40 of the display apparatus 2'. The playback apparatus 1 then determines whether or not 24p video signal input and output is available on the basis of the received information.

Figure 26:
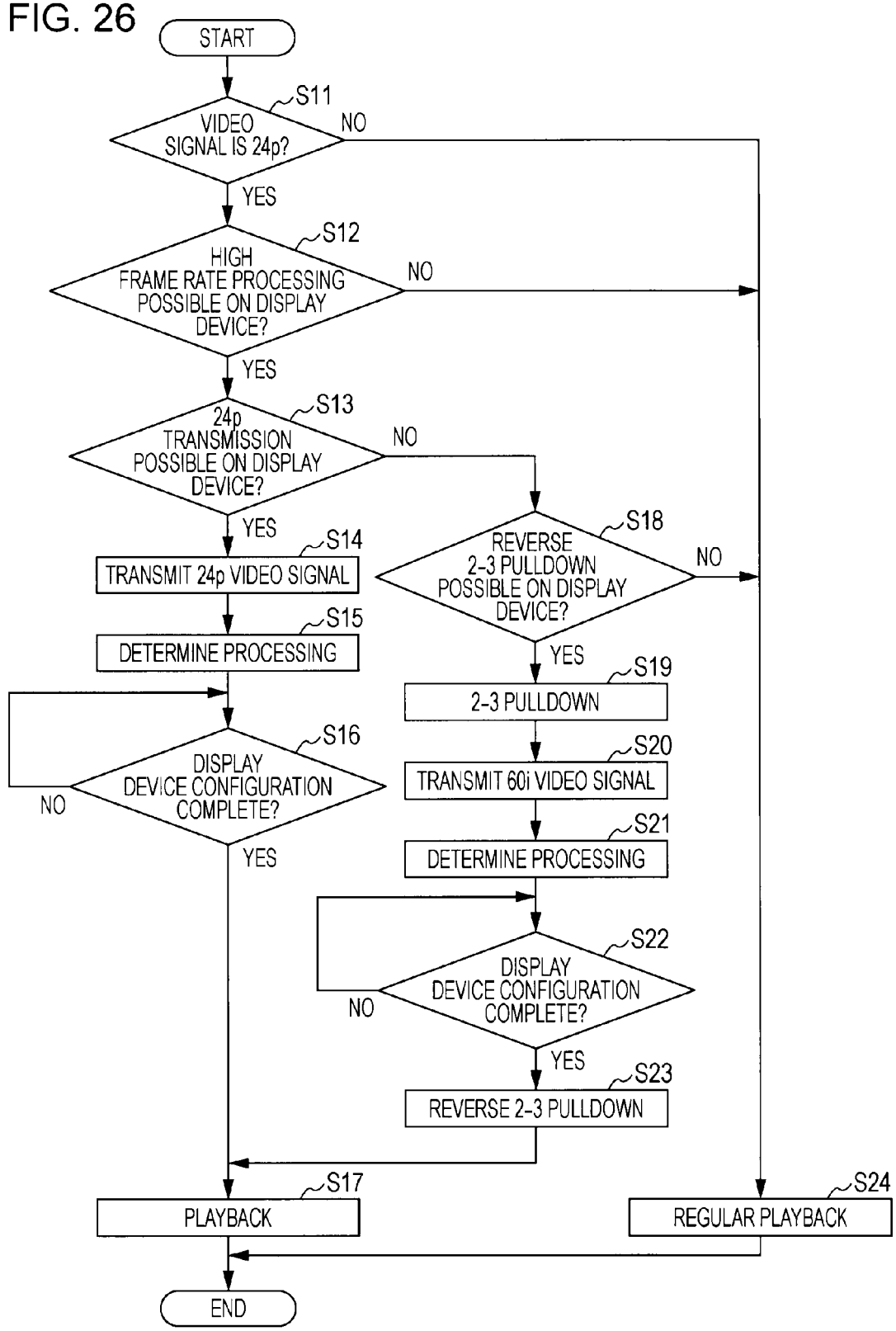
FIG. 26 is a flowchart illustrating the flow of an exemplary image display process in accordance with the second embodiment of the present invention.
Figure 27:
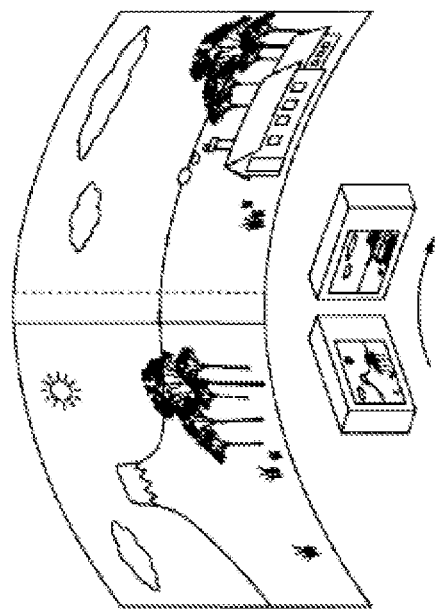
FIG. 27 is a schematic diagram for explaining a panoramic photograph.
Figure 28:
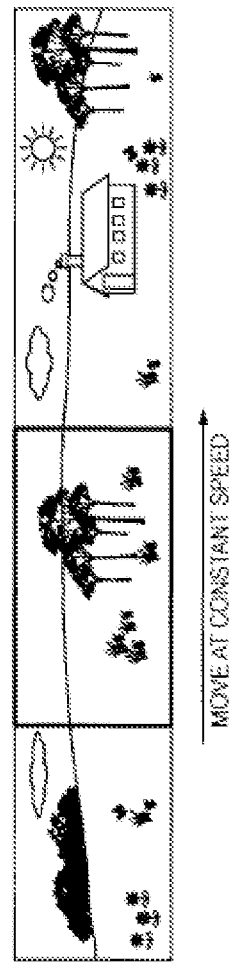
FIG. 28 is a schematic diagram for explaining how a panoramic image may be displayed.
Figure 29:
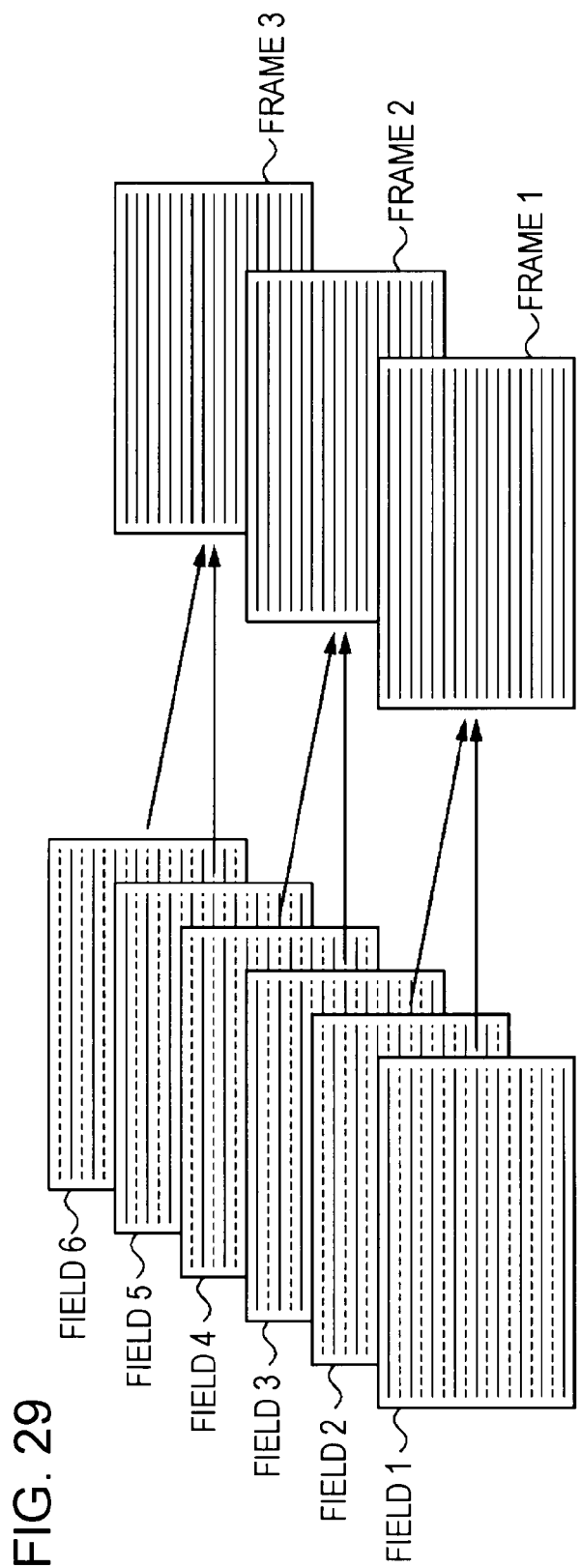
FIG. 29 is a schematic diagram for explaining simple field blending.
Figure 30:
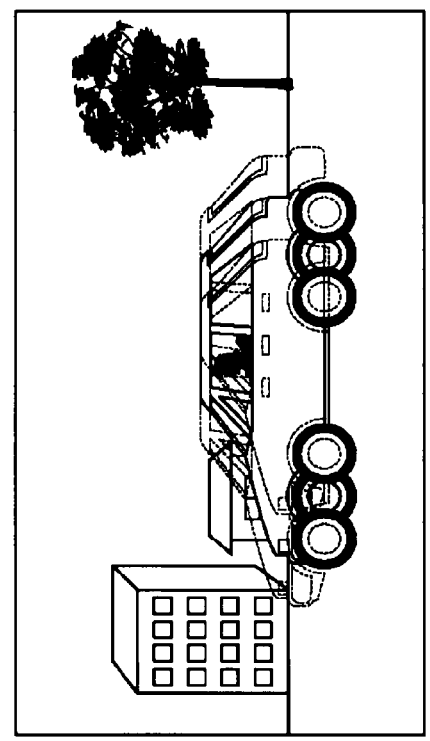
FIG. 30 is a schematic diagram illustrating an example of a frame image generated by simple frame blending.

FIG. 26 is a flowchart illustrating the flow of an exemplary image display process in accordance with the second embodiment of the present invention. The process shown in the flowchart is an example of a process executed when playing back a video signal generated by moving a panoramic image or similar giant image data in a constant direction at constant speed. Herein, the case of playing back a 24p video signal is described by way of example.

In step S11, the playback apparatus 1 determines whether or not the video signal recorded onto the recording medium 15 is a 24p video signal. If it is determined that the video signal is a 24p video signal, then the process transitions to step S12.

In step S12, the playback apparatus 1 uses the DDC to communicate with the display apparatus 2' and acquire device-specific information, and on the basis of the acquired information, determine whether or not high frame rate processing is available in the display apparatus 2'. If it is determined that high frame rate processing is available in the display apparatus 2', then the process transitions to step S13.

In step S13, the playback apparatus 1 determines whether or not the display apparatus 2' is compatible with 24p video signal input and output, on the basis of the device-specific information acquired from the display apparatus 2'. If it is determined that the display apparatus 2' is compatible with 24p video signal input and output, then the process transitions to step S14, and the 24p video signal recorded onto the recording medium 15 is read out. In addition, speed information is read from the header of the 24p video signal and stored in an HDMI vendor-specific InfoFrame. Subsequently, the 24p video signal and the speed information are transmitted to the display apparatus 2' via the HDMI transmitter 16.

In step S15, the display apparatus 2' references the table shown in FIG. 15 that has been stored in advance, and determines how to process the 24p video signal on the basis of the speed information stored in the supplied vendor-specific InfoFrame. In the present example, it is determined that high frame rate processing is to be applied to the 24p video signal.

In step S16, the display apparatus 2' configures itself for high frame rate processing. When configuration for high frame rate processing is completed, the process transitions to step S17. However, if configuration for high frame rate processing is not yet complete, the process returns to step S16, and the display apparatus 2' again configures itself for high frame rate processing. In step S17, the display apparatus 2' applies high frame rate processing to the 24p video signal to increase the frame rate to a predetermined value, and then displays the result on the display 26.

In contrast, if it is determined in step S13 that the display apparatus 2' is not compatible with 24p video signal input and output, then the process transitions to step S18. In step S18, the playback apparatus 1 determines whether or not reverse 2-3 pulldown is available in the display apparatus 2'. If it is determined that reverse 2-3 pulldown is available in the display apparatus 2', then the process transitions to step S19.

In step S19, the playback apparatus 1 applies 2-3 pulldown to the 24p video signal read out from the recording medium 15, thereby generating a 60i video signal. In addition, the playback apparatus 1 reads speed information from the header of the generated 60i video signal, and stores the speed information in a vendor-specific InfoFrame. In the subsequent step S20, the generated 60i video signal and the speed information is transmitted to the display apparatus 2'.

In step S21, the display apparatus 2' references the table that has been stored in advance and determines how to process the 60i video signal on the basis of the speed information stored in the supplied vendor-specific InfoFrame. In the present example, it is determined that reverse 2-3 pulldown is to be applied to the 60i video signal, and additionally, that high frame rate processing is to be applied to the 24p video signal generated by reverse 2-3 pulldown.

In step S22, the display apparatus 2' configures itself for reverse 2-3 pulldown and high frame rate processing. When configuration for reverse 2-3 pulldown and high frame rate processing is completed, the process transitions to step S23. However, if configuration for reverse 2-3 pulldown and high frame rate processing is not yet complete, the process returns to step S22, and the display apparatus 2' again configures itself for reverse 2-3 pulldown and high frame rate processing.

In step S23, the display apparatus 2' applies reverse 2-3 pulldown to the 60i video signal, thereby generating a 24p video signal. The process then transitions to step S17.

In contrast, if it is determined in step S11 that the video signal is not a 24p video signal, if it is determined in step S12 that high frame rate processing is not available, or if it is determined in step S18 that reverse 2-3 pulldown is not available in the display apparatus 2', then the process transitions to step S24, and ordinary playback is conducted. When conducting ordinary playback in step S24, the image display processing in the first embodiment described earlier may be conducted, for example.

In this way, in the second embodiment of the present invention, high frame rate processing is applied to a video signal having a panoramic image or similar giant image data as source data. In so doing, the video signal is played back with its frame rate increased to a predetermined value. Consequently, panoramic images or similar giant image data can be played back smoothly.

The foregoing thus describes a first and a second embodiment of the present invention. However, it should be appreciated that the present invention is not limited to the first and second embodiments of the present invention described above, and that various modifications and applications are possible without departing from the scope and spirit of the present invention. For example, although the NTSC format was described by way of example herein, the present invention is not limited thereto, and an embodiment may also be applied to the case of the Phase Alternation by Line (PAL) format.

Furthermore, although the playback apparatus 1 is implemented as the source equipment in the foregoing, the present invention is not limited to such an example. For example, a recording and playback apparatus able to record video signals onto the recording medium 15 may also be implemented.

The present application contains subject matter related to that disclosed in Japanese Priority Patent Application JP 2008-261245 filed in the Japan Patent Office on Oct. 8, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A picture signal processing system, comprising:
a playback apparatus;
and a display apparatus;
wherein
the playback apparatus includes
an input unit configured to receive a video signal made up of source data generated by moving an image data in a constant direction at a constant speed, wherein a number of pixels in the image data is greater than a number of pixels in a display region;
a playback unit configured to play back the video signal input into the input unit, and
a first communication unit configured to communicate with other equipment,
the playback apparatus is able to exchange video signals with the other equipment via the first communication unit,
the display apparatus includes:
a picture signal processor configured to process a video signal in a predetermined way,
a display configured to display the processed video signal,
a table wherein speed information indicating speeds of the source data for the video signal is associated with types of processing to be applied to the video signal, and
a second communication unit configured to communicate with other equipment,
the display apparatus is able to exchange video signals with the other equipment via the second communication unit, and wherein
when the playback apparatus and the display apparatus are connected by the first and second communication units,
the playback apparatus reads out source data speed information stored in a header of the video signal, and transmits the video signal and the speed information to the display apparatus, and
the display apparatus references the table and applies picture signal processing to the video signal on the basis of the speed information received via the second communication unit, wherein the communication conducted by the first and second communication units is based on the HDMI standard, wherein the speed information is stored in an HDMI InfoFrame packet and transmitted to the display apparatus.

2. The picture signal processing system according to claim 1, wherein the video signal is an interlaced signal having a field frequency of 60 Hz.

3. The picture signal processing system according to claim 1, wherein the picture signal processing applied to the video signal by the display apparatus is 2-2 pulldown.

4. The picture signal processing system according to claim 2, wherein the video signal is made up of progressive source data having a frame frequency of 30 Hz and generated by moving the image data in pixel units synched to ⅟30 seconds.

5. The picture signal processing system according to claim 1, wherein the picture signal processing applied to the video signal by the display apparatus is frame rate processing above a predetermined threshold.

6. The picture signal processing system according to claim 5, wherein the video signal is made up of progressive source data having a frame frequency of 24 Hz and generated by moving the giant image data in pixel units synched to ⅟24 seconds.

7. The picture signal processing system according to claim 1, wherein the playback apparatus receives a video signal recorded onto a recording medium at the input unit.

8. The picture signal processing system according to claim 1, wherein
the playback apparatus further includes a tuner configured to receive electromagnetic waves of a digital television broadcast, and selectively acquire a predetermined video signal from the received electromagnetic waves, and
the playback apparatus receives the video signal acquired by the tuner at the input unit.

9. A picture signal processing method comprising:
in a playback apparatus:
reading out a speed information indicating a speed of a source data stored in a header of a first video signal, wherein the first video signal received by the playback apparatus is made up of the source data generated by moving an image data in a constant direction at a constant speed, wherein a number of pixels in the image data is greater than a number of pixels in a display region of a display apparatus;

generating a second video signal from the first video signal using at least one interlaced and/or progressive conversion technique, transmitting the second video signal and the speed information to the display apparatus, wherein a communication between the playback apparatus and the display apparatus is based on the HDMI standard, wherein the speed information is stored in an HDMI InfoFrame packet and transmitted to the display apparatus, wherein the display apparatus determines a type of picture signal processing associated with the speed information of the source data in the second video signal, and wherein the display apparatus applies the determined picture signal processing to the second video signal on the basis of the received speed information.

10. A playback apparatus, comprising:

an input unit configured to receive a first video signal made up of source data generated by moving an image data in a constant direction at a constant speed, wherein a number of pixels in the image data is greater than the number of pixels in a display region of a display apparatus;

a playback unit configured to play back the first video signal input into an input unit; and a first communication unit configured to communicate with other equipment, wherein the playback apparatus exchanges a second video signal with the other equipment, and reads out a source data speed information stored in a header of the first video signal, and transmits the second video signal and the speed information to the other equipment, wherein the second video signal is generated from the first video signal using interlaced and/or progressive conversion techniques by the playback unit, wherein a communication between the playback apparatus and the display apparatus is based on the HDMI standard, wherein the speed information is stored in an HDMI InfoFrame packet and transmitted to the display apparatus.

11. A picture signal processing method comprising:
in a playback apparatus:

reading out a source data speed information stored in a header of a first video signal, wherein the first video signal received by the playback apparatus is made up of the source data generated by moving an image data in a constant direction at a constant speed, wherein a number of pixels in the image data is greater than a number of pixels in a display region of a display apparatus;

generating a second video signal from the first video signal using at least one interlaced and/or progressive conversion technique, and transmitting the second video signal and the speed information to other equipment, wherein a communication between the playback apparatus and the display apparatus is based on the HDMI standard, wherein the speed information is stored in an HDMI InfoFrame packet and transmitted to the display apparatus.

12. A display apparatus, comprising:

a picture signal processor configured to process a video signal in a predetermined way, wherein the video signal is made up of a source data generated by moving an image data in a constant direction at a constant speed, and wherein a number of pixels in the image data is greater than a number of pixels in a display region of the display apparatus configured to display the processed video signal, wherein the picture signal processor determines a type of processing associated with a speed information for the source data of the video signal, wherein the video signal is transmitted by a first communication unit of a playback apparatus and received by a second communication unit of the display apparatus; and the second communication unit configured to communicate with other equipment;

wherein a communication is established via the second communication unit, the display apparatus exchanges video signals with the other equipment, and receives the speed information, and determines the type of processing associated with the received speed information and based on the determined processing generating processed video signals, wherein the communication conducted by the first and second communication units is based on the HDMI standard, wherein the speed information is stored in an HDMI InfoFrame packet and transmitted to the display apparatus.

13. A picture signal processing method comprising:
in a display apparatus:

receiving a speed information by the display apparatus indicating the speed of a source data for the video signal wherein the video signal is made up of the source data received by a playback device generated by moving an image data in a constant direction at a constant speed, wherein number of pixels in the image data is greater than a number of pixels in a display region;

determining a type of picture signal processing associated with the speed information received; and applying the determined picture signal processing to the video signal on the basis of the received speed information, wherein a communication between the playback apparatus and the display apparatus is based on the HDMI standard, wherein the speed information is stored in an HDMI InfoFrame packet and transmitted to the display apparatus.

* * * * *